US006304574B1

(12) United States Patent
Schoo et al.

(10) Patent No.: US 6,304,574 B1
(45) Date of Patent: *Oct. 16, 2001

(54) DISTRIBUTED PROCESSING OF HIGH LEVEL PROTOCOLS, IN A NETWORK ACCESS SERVER

(75) Inventors: Daniel L. Schoo, Island Lake; Richard Varman, Deer Park, both of IL (US); Stanley T. Naudus, Springfield, VA (US); Vijay J. Nadkarni, Naperville, IL (US); Ying Wu, Grass Valley, CA (US); Tom Gentles, Algonquin; Leland O. Thompson, Carpentersville, both of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/970,834

(22) Filed: Nov. 14, 1997

Related U.S. Application Data

(63) Continuation-in-part of application No. 08/486,591, filed on Jun. 7, 1995.

(51) Int. Cl.[7] ............................ H04L 12/66; H04L 12/28; H04J 3/16; H04J 3/22
(52) U.S. Cl. ...................... 370/401; 370/352; 370/356; 370/466; 370/402; 379/93.05; 379/93.34
(58) Field of Search .................................. 370/402, 352, 370/356, 401, 400, 466; 379/88, 88.17, 93, 142, 67; 709/201, 202, 249, 219, 225, 250

(56) References Cited

U.S. PATENT DOCUMENTS 4,387,424   6/1983   Frediana et al. .
4,471,427   9/1984   Harris .
4,590,551   5/1986   Mathews .

(List continued on next page.)

FOREIGN PATENT DOCUMENTS 0776102    5/1997   (EP) .
WO9641434  12/1996  (WO) .
WO9722201   6/1997  (WO) .

OTHER PUBLICATIONS

PPP Quick Reference Guide, Morning Star Technologies (Oct. 21, 1992).
Cirrus Logic, CL–CD2430/CD2431 Data Book (Jan., 1995) pp. 1–5, 61–78.
RFC 1661 The Point–to–Point Protocol, W. Simpson, ed., (Jul., 1994).
RFC 1662 PPP in HDLC–like framing, W. Simpson, ed., (Jul., 1994).

(List continued on next page.)

Primary Examiner—Wellington Chin
Assistant Examiner—M. Phan
(74) Attorney, Agent, or Firm—McDonnell Boehnen Hulbert & Berghoff

(57) ABSTRACT

A method and apparatus for distributing protocol processing among a plurality of computing platforms. Data communications equipment such as Remote Access Devices, Communication Servers, Terminal Servers, and Dial-up Routers provide single user or large-scale multiple user communication access to various computing environments. The equipment costs and performance of such access equipment is related to the amount of CPU processing capability and memory required to support the desired number of serial communication links. It is common to use protocols that terminate in their entirely in the same processing machine. This invention encompasses methods developed to increase the cost/performance capabilities of the communication equipment that supports these serial links, primarily by means of distributing the protocol processing for higher level protocols across multiple computing platforms, including devices such as modems. Examples of such higher level protocols include PPP, SLIP and RTP.

18 Claims, 18 Drawing Sheets

U.S. PATENT DOCUMENTS

| | | |
|---|---|---|
| 4,825,354 | 4/1989 | Agrawal . |
| 5,142,623 | 8/1992 | Staab et al. . |
| 5,218,680 | 6/1993 | Farell et al. . |
| 5,291,479 * | 3/1994 | Vaziri et al. ..................... 370/58.2 |
| 5,295,133 | 3/1994 | Jurkevich . |
| 5,410,754 | 4/1995 | Klotzbach et al. . |
| 5,412,660 | 5/1995 | Chen et al. . |
| 5,438,614 * | 8/1995 | Rozman et al. ..................... 379/93 |
| 5,517,556 | 5/1996 | Pounds et al. . |
| 5,528,595 * | 6/1996 | Walsh et al. ..................... 370/85.13 |
| 5,550,981 * | 8/1996 | Bauer et al. ..................... 395/200.06 |
| 5,577,105 * | 11/1996 | Baum et al. ..................... 379/93 |
| 5,590,181 * | 12/1996 | Hogan et al. ..................... 379/114 |
| 5,636,216 * | 6/1997 | Fox et al. ..................... 370/402 |
| 5,742,670 * | 4/1998 | Bennett ..................... 379/142 |
| 5,867,494 * | 2/1999 | Krishnaswamy et al. ..................... 370/352 |

OTHER PUBLICATIONS

S. Palacharia et al., "Design and Implementation of Real–Time Multimedia Presentation Using RTP" Proceedings of the 21$^{st}$ Annual International Computer Software and Applications Conference, Aug. 13–15, 1997, pp. 376–381.

International Search Report for PCT/US 98/24290 dated Mar. 17, 1999 (PCT counterpart to Instant application).

* cited by examiner

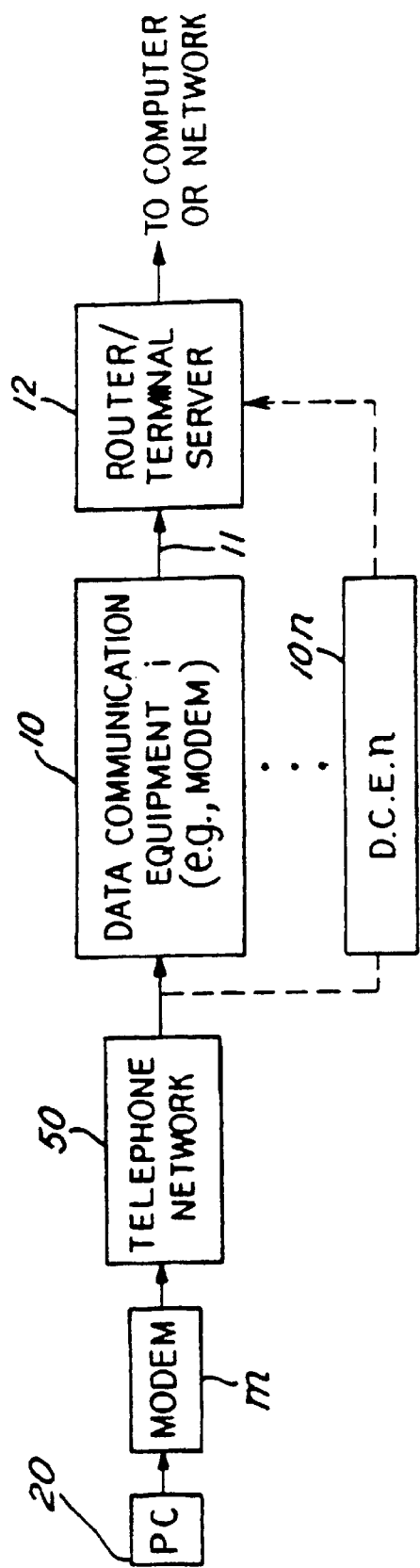
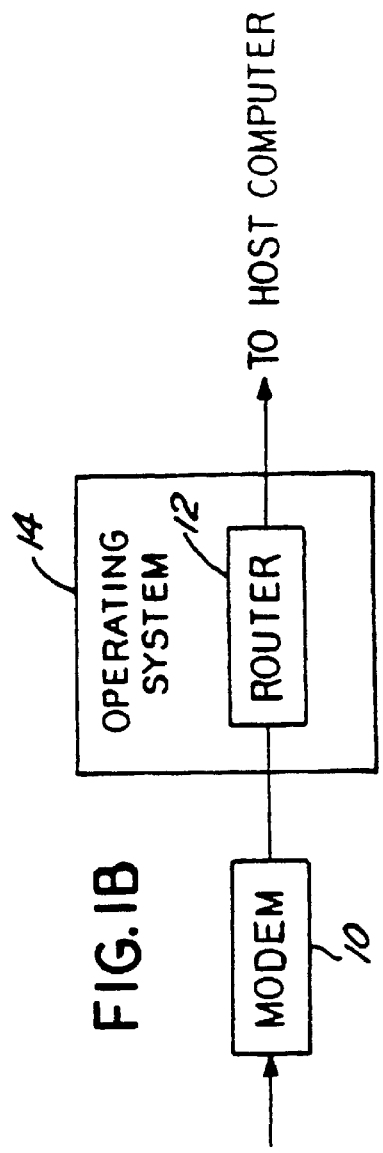
FIG.1A
FIG.1B

PACKET BUS, 374

SBUS DRIVER INTERFACE

HDM SOFTWARE ARCHITECTURE

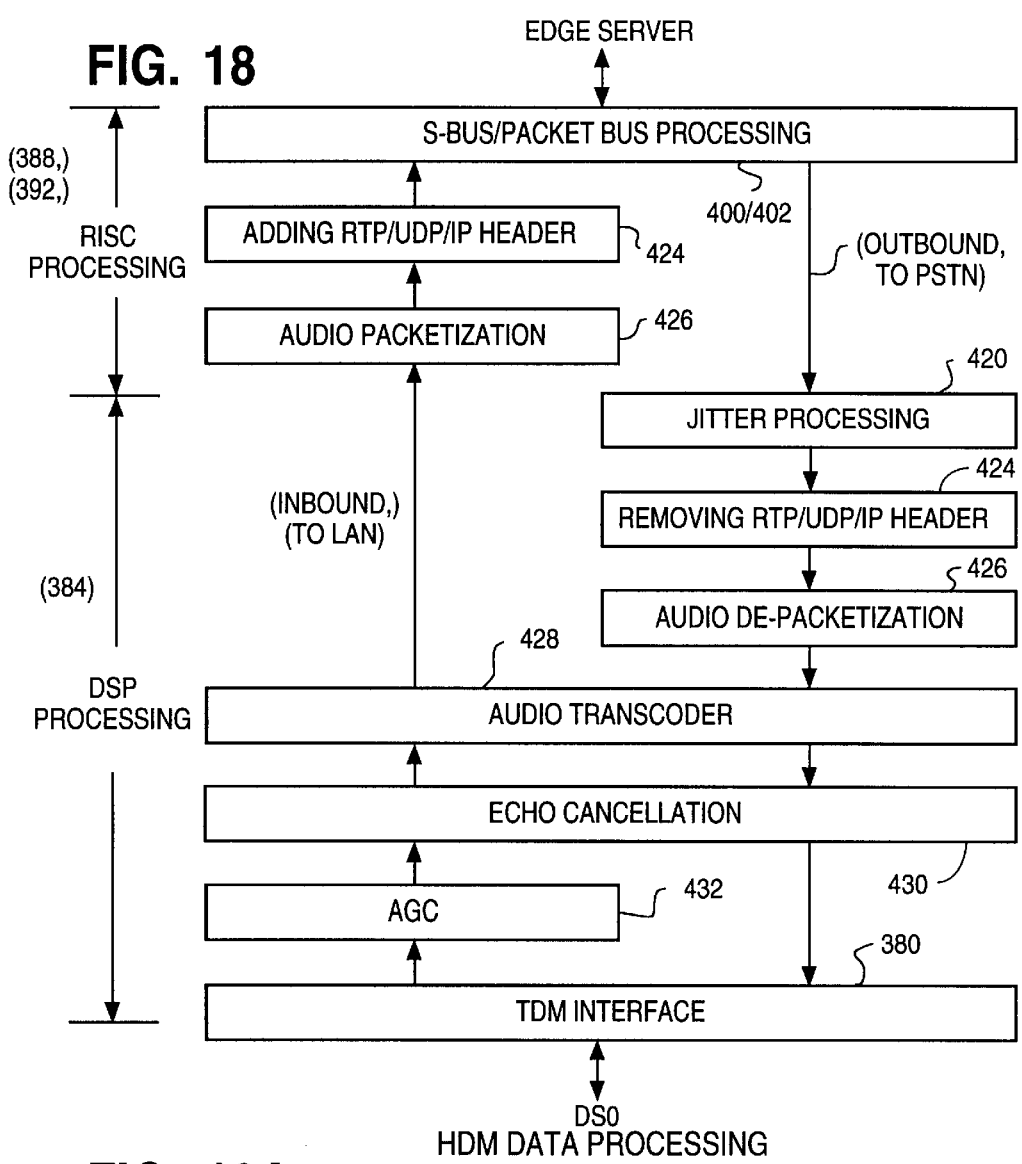
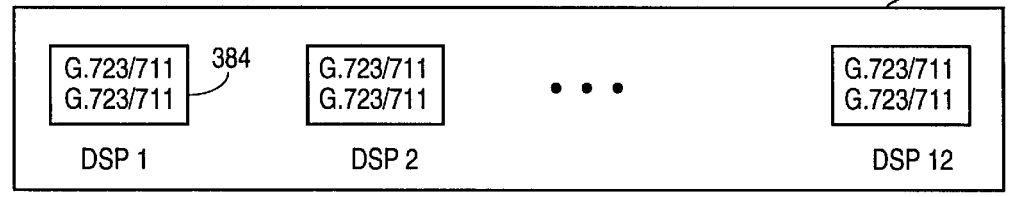
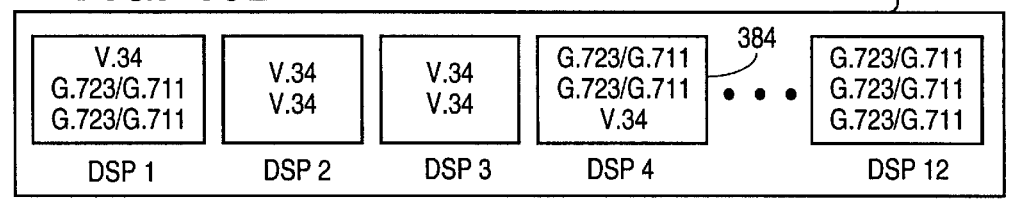

DISTRIBUTED PROCESSING OF HIGH LEVEL PROTOCOLS, IN A NETWORK ACCESS SERVER

CROSS-REFERENCE TO RELATED APPLICATION

This is a continuation in part of the patent application of Daniel L. Schoo, et al., Ser. No. 08/486,591 filed Jun. 7, 1995, pending, the contents of which are incorporated by reference herein.

BACKGROUND OF THE INVENTION

A. Field of the Invention

This invention relates to the field of data communication and apparatus and methods for receiving and transmitting data, video and/or audio communications through a communications access system, such as an integrated network access server. More particularly, the invention relates to apparatus and methods for distributing the processing of higher level network protocols for a single communication session in such a system among multiple computing platforms.

Examples of such higher level network protocols which are subject to distributed processing described herein are the Point-To-Point Protocol (PPP), the Serial Line Interface Protocol (SLIP), and the Real-time Transport Protocol (RTP). However, the principles and methods of the invention are applicable to other types of higher level protocols.

As described in detail below, the processing of the protocols is distributed in the preferred embodiments such that one computing platform, such as the computing platform at a local or wide area network gateway, performs part of the processing of the protocol, while another computing platform, e.g., the computing platform in a digital signal processor (DSP) or modem module, performs the remainder of the protocol processing. In this manner, the throughput and efficiency of the call processing of the network access server is substantially increased.

B. Description of Related Art

The methods disclosed herein can be performed by an element of communications equipment referred to herein as a "network access server." The network access server is a device that is capable of receiving a plurality of simultaneous incoming calls from the Public Switched Telephone Network (PSTN) and routing them to a packet switched computer network for transmission to a host computer system, or telephone or other device connected to the computer network. The network access server is also capable of handling multiple simultaneous calls from the computer network and directing them onto a communications link in the PSTN for transmission to the remote user.

The patent to Dale M. Walsh et al., U.S. Pat. No. 5,528,595, entitled MODEM INPUT/OUTPUT SIGNAL PROCESSING TECHNIQUES which is fully incorporated by reference herein, describes an integrated network access server suitable for use in the present invention. Such a device has been commercialized widely by 3Com Corporation (previously U.S. Robotics Corp.) under the trade designation Total Control™ Enterprise Network Hub. Network access servers similar in functionality, architecture and design are available from other companies, including Ascend Communications, Livingston Enterprises, Multitech, and others. The invention is suitable for implementation in network access servers from the above companies, and other similar devices.

In order to facilitate such communication, industry and international standards bodies have established sets of functional requirements, conventions or rules that govern the transmission of data over both telephone and packet switched computer networks. These functional requirements or rules are known in the art as "protocols." The implementation of protocols is necessary in order to bring order, and standardization, to the communications field and allow equipment of diverse manufacturers to be interoperable. Some protocols are considered low level transmission media related modulation protocols, such as modulation schemes implemented in a modem, for example V.34, V.22 bis, etc. Other protocols are considered higher level, and relate to such features as error control, transmission control protocols and network level routing and encapsulation of data. The requirements of these latter protocols are typically prepared as a "Request For Comment" document, circulated among the industry, and eventually adopted by the standards bodies. The present invention is concerned with the distributed processing of these higher level network control protocols. Examples of such protocols are the Point-to-Point Protocol (PPP), the Serial Line Interface Protocol (SLIP), and the Real-time Transport Protocol (RTP).

In order to process communications between the computers on the local area network and the remote computers connected via the telephone system, the processing of the higher level protocols must be performed. In the prior art, a single platform at the network interface has been used to perform the higher level processing. It has been discovered that this results in inefficiencies and loss of throughput, particularly when the maximum call capacity in the network access server in either the inbound or outbound direction is approached.

In our distributed processing invention, a dramatic increase in the efficiency of the call routing process can be achieved, thereby maximizing call throughput and minimizing the overall call connect time. This result is achieved by distributing the computationally intensive protocol processing of higher level network protocols (such as Point-to-Point Protocol ( PPP) processing or RTP) among multiple computing platforms such as the modems of the network access server assigned to each of the sessions. As another example, processing of the protocols may be distributed by performing some of the processing in one platform at the gateway and performing computationally intensive protocol processing in the modems. For example, RTP protocols associated with audio and video conferencing may be distributed such that some processing of RTP is performed in the gateway platform, for example RTCP, IP, UDP and central coordination of RTP streams, while the modem or DSP platform performs RTP jitter buffering and encapsulation of audio frames with RTP header data. In addition, the modem or DSP platform perform lower level protocol processing, including all audio processing, transcoding, DTMF (dual tone multifrequency tone) generation, and echo cancellation.

Various types of communication devices are placed at the interface between a modem and a computer network, such as routers, terminal servers, and modules sometimes referred to as "gateway cards." These devices implement software programs that control the inflow and outflow of calls between the modems and the network. These devices are referred to herein generally as "network interface" devices. One layer of the software hierarchy that is run in these devices is known in the art as an "application layer". This document makes occasional reference to the terms "applications", "application layer" and "application software layer." As used herein, these terms means a communication control and management software layer above the protocol stacks in a communication device, the device typically placed at the gateway (or interface) between a modem and a computer network.

To better illustrate some of the advantages of the invention, one embodiment of the invention is described herein in which the modem or DSP platform in the network access server perform asynchronous High-level Data Link Control (HDLC) framing of Point-to-Point Protocol (PPP). The protocol could be synchronous HDLC framing of PPP in other implementations. The modem performs the flag sequence, data transparency, and Frame Check Sequence (FCS) on each PPP frame. The second protocol processing performed in the modem or DSP platform is Serial Line Internet Protocol (SLIP).

In the prior art, when an application software routine at the network access server gateway creates a PPP (or SLIP) frame, it checks each byte, looking for a byte that is a control character. If the application finds a control character, a PPP Escape character (or SLIP Escape character) is stuffed into the data stream. Then, the original control character is translated to a transparent character and stuffed into the data stream. This usually requires two buffers, because extra characters are added. For PPP frames, while the application is looking at each byte of the frame, it must also calculate the FCS. When the application receives a PPP (or SLIP) frame, it must do the reverse of the above process. In some network access servers, such as the Total Control network access server of 3Com Corporation, a large number of modems may be active at any one time. This means that the gateway computing platform in the network access server would be doing this process for each of the modems if the prior art technique was used. This results in a extremely heavy processing load on one computing platform, and introduces latencies and delays in the call routing process. These effects combine to significantly reduce call throughput, particularly where a large volume of calls are simultaneously received or transmitted through the network access server. This call latency and delay is substantially reduced in accordance with the methods and system described herein. Similar improvements are expected in an situation wherein distributed processing of other higher level protocols is performed, such as RTP, as set forth below.

SUMMARY OF THE INVENTION

The present invention provides a method for routing incoming or outgoing calls between a computer network and the PSTN. For incoming calls, the method comprises the steps of receiving the incoming calls and directing the calls to a plurality of modems, distributing the processing of protocols for the incoming calls among multiple computing platforms in the modems and processing the protocols for the incoming calls, and subsequently routing the incoming calls to the computer system over a computer network via a network interface or gateway. For outgoing calls, the calls are directed from the computer network to a plurality of modems in the network access server. The protocol processing is distributed among a plurality of computing platforms in the modems, and the calls are sent out to a communications link such as a T1 telephone line.

In one preferred embodiment of the invention, the method is performed in a network access server having a plurality of modems for receiving a plurality of incoming calls or modulating a plurality of calls onto a communications link. The computing platforms comprise the data processing structures in each modem.

One of the embodiments described below provides for the distributed processing of the RTP protocol associated with real-time video or audio traffic. Part of the processing is performed in the computing platform in the network interface and some of the processing is performed at one or more computing platforms in the modem. Distributed processing of RTP in this fashion provides a number of distinct advantages, both in terms of scaling, efficient use of computing resources, and delay reduction.

First, the technique deals with talk spurts from the packet switched computer network side (such as a local area network or LAN) to be handled in an efficient manner. If the entire RTP protocol was implemented on the network interface platform, it would make the development of a solution for a phenomenon known as "talk spurt", i.e., a burst of audio data, more difficult and cause scaling problems in a high density network access server. One gateway platform can support many different high density and general purpose DSP cards (for example, cards dedicated at least in part to modem functions), each performing a number of functions. Using the techniques described herein, hundreds of calls can be processed simultaneously in a single network access server.

Second, it uses resources more efficiently, particularly in an environment in which a network operating system is run on the gateway computing platform, such as Windows NT™ or UNIX-based operating systems. Distributed RTP processing is designed to allow the gateway application to transfer the RTP packet through the gateway to the LAN in one kernel mode operation. Conversely, since the operating system running on the general purpose DSP or modem platform is particularly suitable for real time traffic processing, it can effectively handle the RTP end-point functionality.

Third, the method provides for reduced end to end delay. The invention not only reduces the overall delay in the system, it hides the variation in delay inherent in packet switched computer network from the end user. Such advantages are particularly important in real time voice or video applications. The method provides for dynamic jitter buffering in the modem and/or general purpose DSP cards, which adapt to delay due to internal processing within the network access server as well as delay in the computer network traffic. The term "jitter", as used herein, refers to the variation in delay in both the packet switched network and within the network access server. Dynamic jitter control can be accomplished by increasing or decreasing the amount of data that is being buffered within the system. This buffering mechanism is able to account for, as accurately as possible, the actual jitter or variation in delay characteristics of the packet switched computer network while shrinking the overall delay within the real time processing provided by the network access server. Moreover, if all RTP processing were done at the gateway platform, a simple jitter buffer would still be required at the PSTN interface due to the jitter added by the RTP processing itself inside the system. The basic need is to take an a synchronous data steam (from the packet switched network) and convert it to a synchronous data stream for the PSTN carrier system without noticeable impact to the user. By implementing a jitter buffering mechanism as a close as possible to the synchronous PSTN interface (i.e., in a modem or general purpose DSP computing platform), the need for a second buffer, as explained above, is removed along with the delay that would be attributed to this data storage within the system.

These and many other advantages and features of the invention will become more apparent from the following detailed description of presently preferred embodiments of the invention.

BRIEF DESCRIPTION OF THE DRAWINGS

Presently preferred embodiments of the invention will be described in conjunction with the drawings, in which like reference numerals refer to like elements in the various views, and in which:

FIG. 1A is a block diagram illustrating one form in which the invention may be implemented;

FIG. 1B is a block diagram illustrating the implementation of the routing function of FIG. 1A in the operating system software of a host computer;

FIG. 18 is a block diagram of the data processing architecture for the high density modems, showing the division of processing between the RISC chips and the DSPs, showing the processing of the RTP/UDP and IP headers by the RISC chips for inbound traffic, and jitter processing, and RTP/UDP/IP processing by the DSPs for outbound traffic;

FIG. 19A is an illustration of one possible configuration of the DSPs for the high density modem card, showing the type of transcoding that may be performed by the DSPs in an Internet telephony application based on RTP; and FIG. 19B is an illustration of a more versatile configuration of the DSPs for the high density modem card, showing the type of tasks that may be performed by the DSPs, in an embodiment in which the network access server provides for both remote computer network access and Internet telephony types of functionality.

Figure 2:
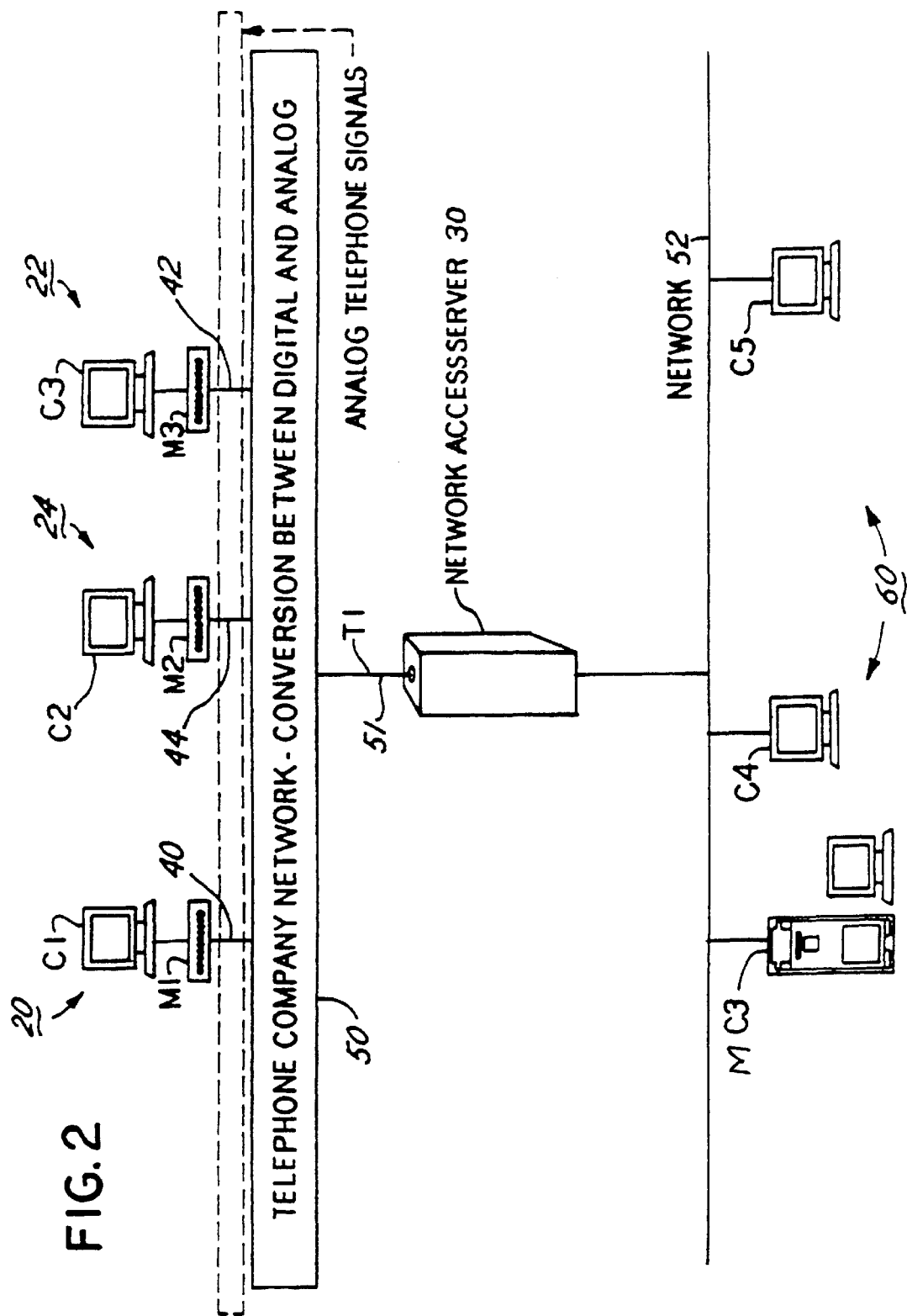
FIG. 2 is an illustration of the overall communications system in which an alternative form of the invention is implemented, illustrating the relationship between various call originators, a telephone network, a network access server, and a host computer system linked to the network access server via a network.

DETAILED DESCRIPTION OF THE PREFERRED AND ALTERNATIVE EMBODIMENTS OF THE INVENTION

Overview and Distributed PPP and Slip Processing Embodiments

Referring to FIG. 1A, the invention may be implemented in a communications system in which a call originates from a computer, such as a PC 20, which sends data via a Data Communications Equipment (DCE) (such as modem M) onto telephone network 50 or other communications link to a receiving DCE 10, such as a modem. The call originating data terminal 20 has communication software that uses a communications protocol, such as PPP or SLIP. The DCE 10 demodulates the call from the personal computer 20 and passes it over a transmission means 11, for example an RS 232 cable or packet bus, to a router or terminal server 12. The router or terminal server 12 passes the call onto a network or host computer system for example a personal computer (not shown in FIG. 1A). Up to n DCE's 10 may be provided, depending on the amount of expected incoming traffic. Or, for some applications, only a single DCE or modem 10 may be required. The DCE 10 and router 12 functions may be implemented in physically distinct hardware, or combined into a single piece of equipment such as in the case of the network access server discussed in conjunction with FIG. 2.

In a preferred form of the present invention, the byte to byte transparency translation processing required by the PPP (or SLIP) protocol is distributed to the DCE 10 processor, rather than being performed in a computing platform in the router or terminal server 12 as in the prior art. This frees the application processor (such as the computing platform at router or terminal server 12) from this time consuming task. The modem 10 processor already deals with the data on a byte by byte process as it passes data to or from the modem's data pump. The additional task of data transparency and FCS calculating is not as burdensome as it is for a multi-session application, and hence the modem processor is a preferred computing platform in which to implement the invention.

In our preferred form of the invention, the application software processor at the network interface communicates with the modems 10 via a packet bus, but the communication could be by other equivalent means, such as an RS 232 cable. Two types of messages are passed between them, such as configure requests and responses, and data. Other message types are not applicable to this implementation. All messages have a status field and a length field. There is exactly one PPP or SLIP frame transmitted or received per each packet bus data message. The length field holds the exact number of untranslated data bytes. This is how the modem knows where to insert the flag sequence on outgoing frames.

The basic design of the PPP/SLIP modem 10 is for the gateway application software at the router/terminal server 12 to issue a special command to the modem 10 that puts the modem into PPP mode, SLIP mode, or neither. Other configuration commands that can be issued include: local Async-Control Character-Map, remote Async-Control-Character-Map local Delete character translation (i.e. ASCII 7F hex), remote Delete character translation, maximum frame size, frame timeout, inter-character timeout, and FCS type (e.g. CCITT 16 bit CRC). The modem 10 informs the application software when it is successfully configured.

When the modem 10 receives a data message from the application layer for transmission to the remote PC 20, the modem 10 knows how much data is in the message from the length field. The modem then creates a PPP or SLIP frame by transmitting a frame end character, transmitting the data (translating as required), calculating and transmitting the FCS if it is a PPP frame, then transmitting another frame end character. Note that the PPP address and control fields should be prepended to the PPP data when passed to the modem because the modem does not interpret any data.

When the modem 10 receives a PPP or SLIP frame from the remote location, the modem 10 searches for start of the frame character (which is also the frame end character). This character is discarded. The modem then examines each incoming byte of data, translating transparent data as required and keeping a current FCS if it is a PPP frame, while looking for the trailing frame end character. The trailing frame end character is also discarded. If the modem is configured for PPP, the current FCS value is confirmed to be valid and the last two (or four) data characters, which are the FCS characters, are also discarded (i.e., the length is decremented). This frame of raw data (prepended by the address and control fields if PPP) is immediately passed to the application layer in the gateway (such as the router/ terminal server 12) via a packet bus or an equivalent means. Status values indicate OK, invalid FCS, frame too large, inter-char timeout, frame timeout, and parity error (frame aborts are discarded and the application layer is not informed).

Note that, using the techniques of the present invention, the application computing platform at the network interface never sees any transparent data. It deals with the actual information in the PPP or SLIP frame. Also note that the modem does not interpret the contents of any PPP or SLIP frame. It only does the most basic encapsulation of a datagram over a serial link, i.e., byte by byte transparency translation and FCS. The PPP address and control field and any negotiation, such as LCP or IPCP, are handled at the application software layer. Accordingly, by using the techniques of the present invention, data through-put in both the uploading and downloading directions through the modem 10 and router/terminal server 12 is greatly improved. This is a result of both reduced processing requirements at the gateway computing platform, and a lower overall latency of the system.

Referring again to FIG. 1A, it will be understood that other analogous and functionally equivalent DCE's may be used in accordance with the invention besides the modem 10. For example, other computing platforms, such as a those in a DSU (data synchronizer unit) and CSU (circuit switching unit) may be used in conjunction with a digital data network 50. An ISDN (integrated services digital network) terminal adapter may also be used where the calls come in via ISDN lines.

Referring to FIG. 1B, it will be appreciated that the physical location of the router or terminal server 12 is not particularly important. For example, the router function may exist as a software feature in an operating system 14 for a personal computer, for example, the various versions of the Windows® program of Microsoft Corporation. In this example, the protocol processing is performed in the modem 10. By virtue of the distribution of the protocol processing to the computing platform in the modem 10, rather than in the CPU for the computer, the computational load on the CPU and the latency in the call routing process are reduced, providing for increased call throughput.

Additionally, the particular means for transmitting the calls from the modem to the gateway is not particularly important. An RS 232 cable, a packet bus, or the internal bus of a host personal computer (such as the ISA, EISA, PCI or a VESA bus) may be used. While the above examples refer to SLIP and PPP processing in the modem computing platform (or other applicable platform such ISDN TA or CSU), the invention is applicable to other higher level protocols.

Representative Network Access Server Implementation for PPP or Slip Distributed Processing The present invention may also be implemented in a communication processing system that is depicted generally in FIG. 2. A plurality of call originators 20, 22 and 24 are located at various remote locations, which transmit incoming communications to a network access server 30. Call originator 20, 22 and 24 may consist of a personal computers C1, C2 and C3, respectively, that generates digital data and transmits the data to a modems M1, M2, and M3, which modulates the data onto a telephone lines 40, 42 and 44, respectively. For the purpose of this specification, the particular type of call originators is not important, and the call originators of FIG. 2 are chosen for purposes of illustration only. The call originators have communication software that uses the PPP or SLIP protocol.

In FIG. 2, the data that is transmitted onto the telephone lines at 40, 42 and 44 is in analog form. The illustration in FIG. 2 assumes that the communication system makes use of the public switched telephone network (PSTN) 50 such as the T1 network. The calls from the call originators are digitized and placed into one of the 24 multiplexed channels of the four-wire T1 span line 51 by the telephone company and fed into the network access server 30. As used herein, the term T1 span line refers to twenty-four 64 kbps (thousand bit per second) DS0 channels that are multiplexed in the 1.5444 Mbps DS1 rate, with each DS0 channel carrying the digital representation of an analog voice channel. The term "trunk," as used herein, refers to a single DS0 channel.

The digital signals representing the incoming communications are fed into the network access server 30 by the T1 span line 51 (or possibly two span lines). The network access server 30 then routes the incoming call onto the network 52. The network may be a Token ring network, Ethernet, Internet, or other type of network, the particular details of which are not important. The host computer system 60 then receives the call and process the calls as needed. The host computer system 60 depicted in FIG. 2 consists of a variety of computers such as a personal computer C5, data storage terminal C4, and mainframe computer MC3. As was the case with the call originators 20, 22 and 24, the details of the host computer system 60 has the capability of sending out calls via the network access server 30 to the remote data terminals (such as call originator 20).

Figure 3:
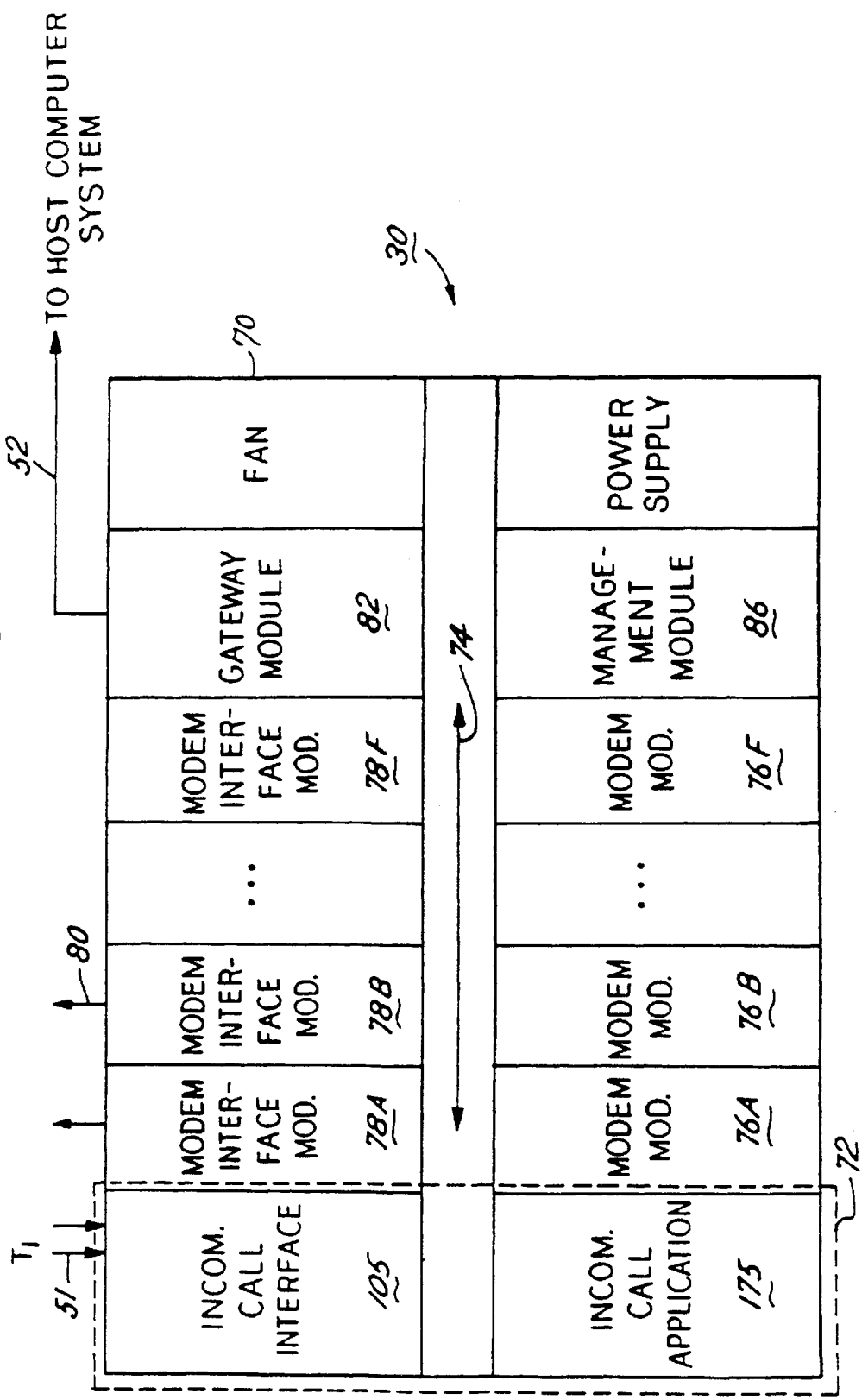
FIG. 3 is a schematic block diagram of a network access server.

Referring now to FIG. 3, the network access server 30 is shown in a functional block diagram form and will be described in more detail. A description of the network access server is set forth in the patent of Dale Walsh et al., U.S. Pat. No. 5,528,595, entitled MODEM INPUT/OUTPUT SIGNAL PROCESSING TECHNIQUES and the reader is directed to the '595 patent for a more exhaustive description. The network access server 30 has a chassis 70 which houses a telephone interface unit 72 which receives the incoming calls on T1 span line 51, demultiplexes the calls, and routes the calls over a high speed time division multiplexed (TDM) bus complex 74 to twelve quad modem modules 76A, 76B, etc. Each modem module 76 has four modems (not shown in FIG. 3) which demodulate the incoming calls. Thus, if there are two T1 span lines 51 incoming to the network access server 30, there are 48 modems in all for the 48 DS0 channels incoming into the network access server 30. The connections on the TDM bus complex between the telephone interface unit and the modems are static or "nailed up" connections, and are established on power-up of the network access server 30. The TDM bus complex 74 carries data back and forth between all of the various modules of the network access server 30. A high speed parallel bus is also part of bus complex 74 and transmits data and messages in packet form between the modem modules after demodulation and the network gateway module 82.

Each modem module 76 is provided with a corresponding modem network interface module 78A, 78B, etc. The modem network interface modules 78 have four sync/async RS 232 ports 80. The RS 232 ports 80 are linked to computers of the host computer system and may be used to output the calls from the network access server 30 to the host computer.

The network access server 30 also includes a gateway application module 82, which functions as a routing and processing engine for directing calls from the network access server to the local area network 52 and vice versa. A representative gateway application module is described in the above-referenced patent to Dale Walsh et al., U.S. Pat. No. 5,528,595, entitled MODEM INPUT/OUTPUT SIGNAL PROCESSING TECHNIQUES and the reader is directed to the Walsh et al. patent for a more detailed discussion. Gateway cards for use in a network access server are commercially available, such as the NetServer™ and EdgeServer™ cards from 3Com Corporation, and such devices are available from other manufacturers of network access servers. A network management module 86 provides management and supervision functions for the network access server 30. The reader is directed to the patent of Rozman et al., U.S. Pat. No. 5,438,614, which is incorporated by reference herein, for a more detailed discussion of a modem management system for use in a network access server.

The telephone interface unit 72 of FIG. 3 is described in detail in the Walsh et al. '595 patent, therefore the reader is directed to the patent for a detailed discussion of its construction and functionality. The card is composed of two separate modules, an incoming call interface 105 module and an incoming call application 175 module. The interface module 105 physically receives the incoming T1 span lines, converts the signal in a digital TTL format, and delivers the signal to the network application module 175. The interface module 105 provides a CSU interface which recovers clock signals and data from the incoming T1 signals, and also provides the transmission of outgoing digital telephone signals representing digital data to line T1. The application module 175 provides framing of recovered T1 data to extract the T1 DS0 channel data and then switches the channel data twenty four time slots on a TDM bus in complex 74 for distribution to the all-digital modems in the modem modules 76.

The digital modem modules 76 and 78 are also described in the Walsh et al. '595 patent in detail, therefore the reader is directed to the Walsh et al. '595 patent for a detailed discussion of the modem cards, their architecture and function, and their interfaces to the TDM bus and the parallel bus on complex 74. The cards are available commercially from 3Com Corporation, and similar modem cards are available from other manufacturers in the industry. Each module 76 contains four modems for a total of 24 modems for 6 modem cards. As a result, the network access server 30 of FIG. 3 can handle a total of 24 simultaneous full duplex channels of data communication. If two T1 span lines are inputted into telephone interface unit 72 (FIG. 3) then 12 modem modules may be provided to handle 48 simultaneous full duplex channels. Of course, additional capacity may be provided if desired.

The protocol processing for the incoming and outgoing calls, in the present embodiment of the invention, is distributed among four modem control processors, one per modem, in the card 76. The data processing and modem control processing functions of the DSP data pump and the modem control processor may be combined into a single digital signal processor. Additionally, part of the protocol processing is performed in the computing platform in the gateway module 82, as described in detail below.

Distributed Processing of PPP and SLIP Protocols

Figure 4:
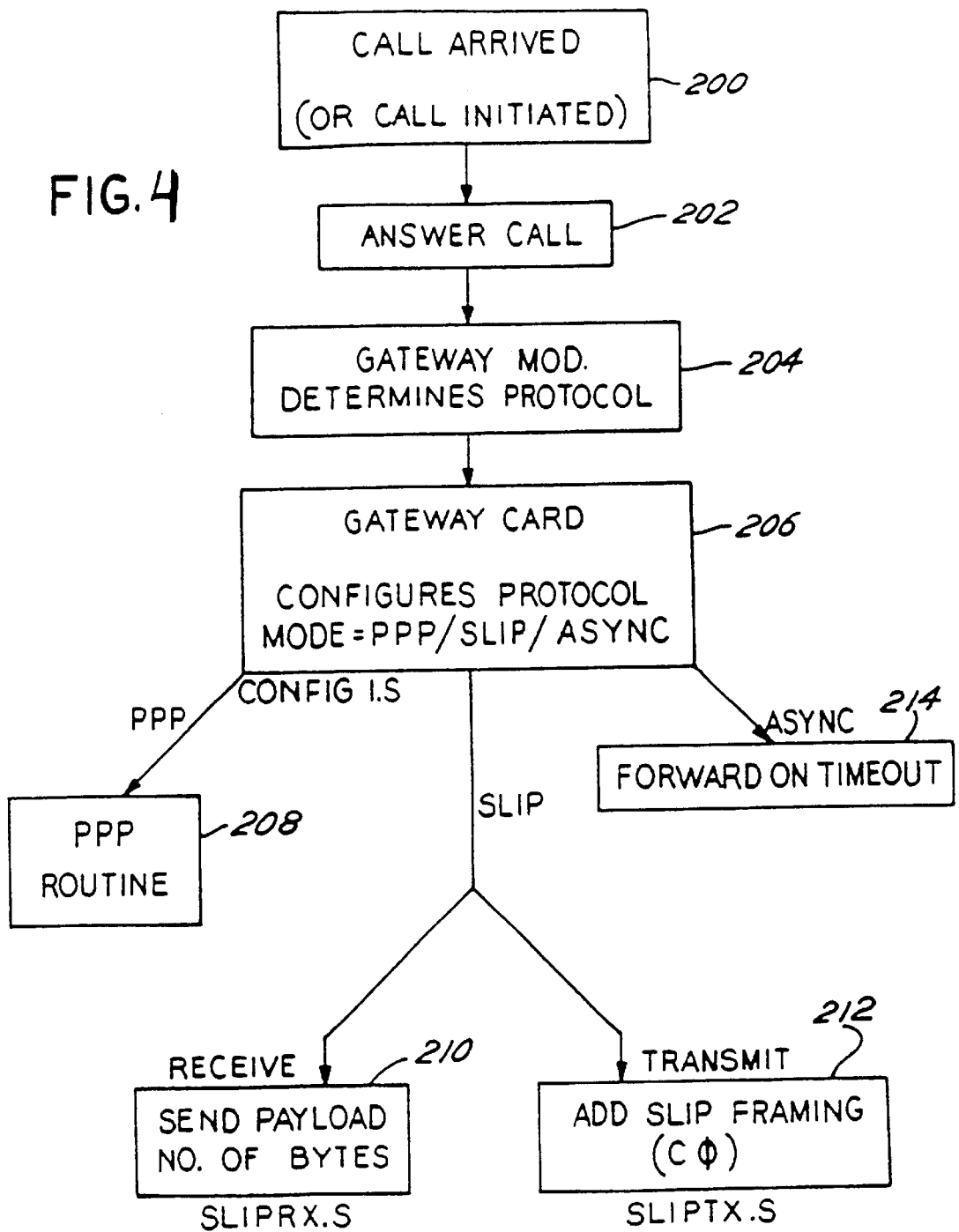
FIG. 4 is a flow chart of the distributed processing procedure.
Figure 5:
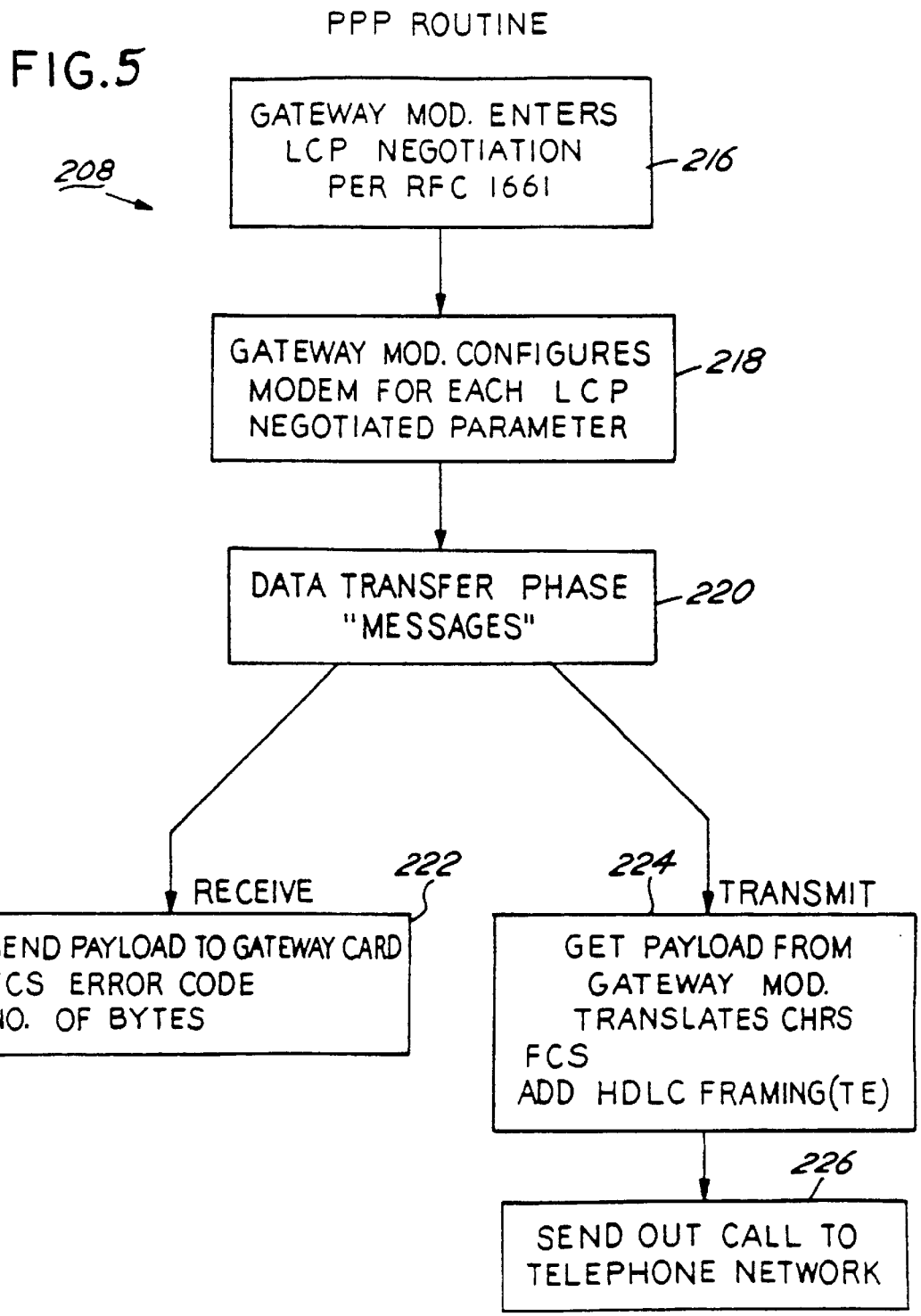
FIG. 5 is a detailed flow chart of the PPP routine of FIG. 4.

With the above description in mind, the reader's attention is directed to FIG. 4 and FIG. 5, which is a flow chart of the distributed PPP and SLIP processing procedure according to one form of the present invention. The following discussion is made in reference to the network access server embodiment of the invention, and persons of ordinary skill in the art will readily understand that the description can be adapted to other possible embodiments.

At step 200, a call is arrived from one of the remote call originators, or else a call is initiated from the host computer system to a remote computer or other data terminal. A step 202, the call is answered in a well known manner. At step 204, the gateway application module 82 (FIG. 3) determines the high level protocol of the incoming or outgoing call. This is done by determining, for example, the port configuration of the call, by the telephone number of the call originator or the call destination, by conversation or menu with the user, by a user name and/or a database look-up, by an automatic detect or inspection of data routine, or whatever other process is implemented.

At step 206 the gateway module 82 configures the protocol mode for the modem. The software routine CONFIG. 1.S set forth in published PCT application serial no. PCT/US96/09661 of Daniel L. Schoo et al. is implemented in this step. The above PCT application is incorporated fully by reference herein, and references in this document to "software listing" refer to the software listing appended to the above PCT application. If the asynchronous transparent protocol is performed, at step 214 a forward on timeout or buffer full command is sent to the modem in the modems module 76. If the SLIP protocol is used, for receiving calls at step 210 the modems remove transparency and translation characters, and send the payload (a number of bytes) or overflow errors to the gateway module 82. In the above-referenced software listing, routines in SLIPRX.S are implemented at this step. For transmitting calls, at step 212 the modems add transparency translation characters and a SLIP framing character. In the appended software listing, the routines in SLIPTX.S are implemented.

If PPP protocol is used, the routine in CONFIG.1.S is implemented at step 208. Step 208 of FIG. 4 is shown in detail FIG. 5. Referring now to FIG. 5, at step 216 the gateway module 82 enters the LCP negotiation procedure per the instructions set forth in the Request For Comments (RFC) 1661 Standard. This is a publicly available document which specifies an Internet standards track protocol for the Internet community. Persons of ordinary skill in the art are familiar with the RFC 1661 document.

At step 218, the gateway module configures the modems for each LCP negotiated parameter. This may be accomplished in order, for example, MTU, TX Async map, RX Async map. In the appended software listings, the routine in CONFIG2.S describe this procedure. The procedure then enters a data transfer phase at step 220 in which "messages" are uploaded or downloaded through the network access server 30. In the receiving or uploading direction, the modems remove the HDLC frame characters, and send the payload, number of bytes and error code (such as good FCS, bad FCS, overrun, or partial), as illustrated in module 222. This procedure is set forth in the software listing PPPRX.S.

In the transmitting (downloading) direction at step 224, the modems get the payload from the gateway module 82, perform character transparency translation and transmit asynchronous map, calculate the FCS, and add HDLC framing characters. At step 226, the messages are sent out through the telephone network 51. This procedure is set forth in the PPPTX.S routine in the software listing.

Figure 6:
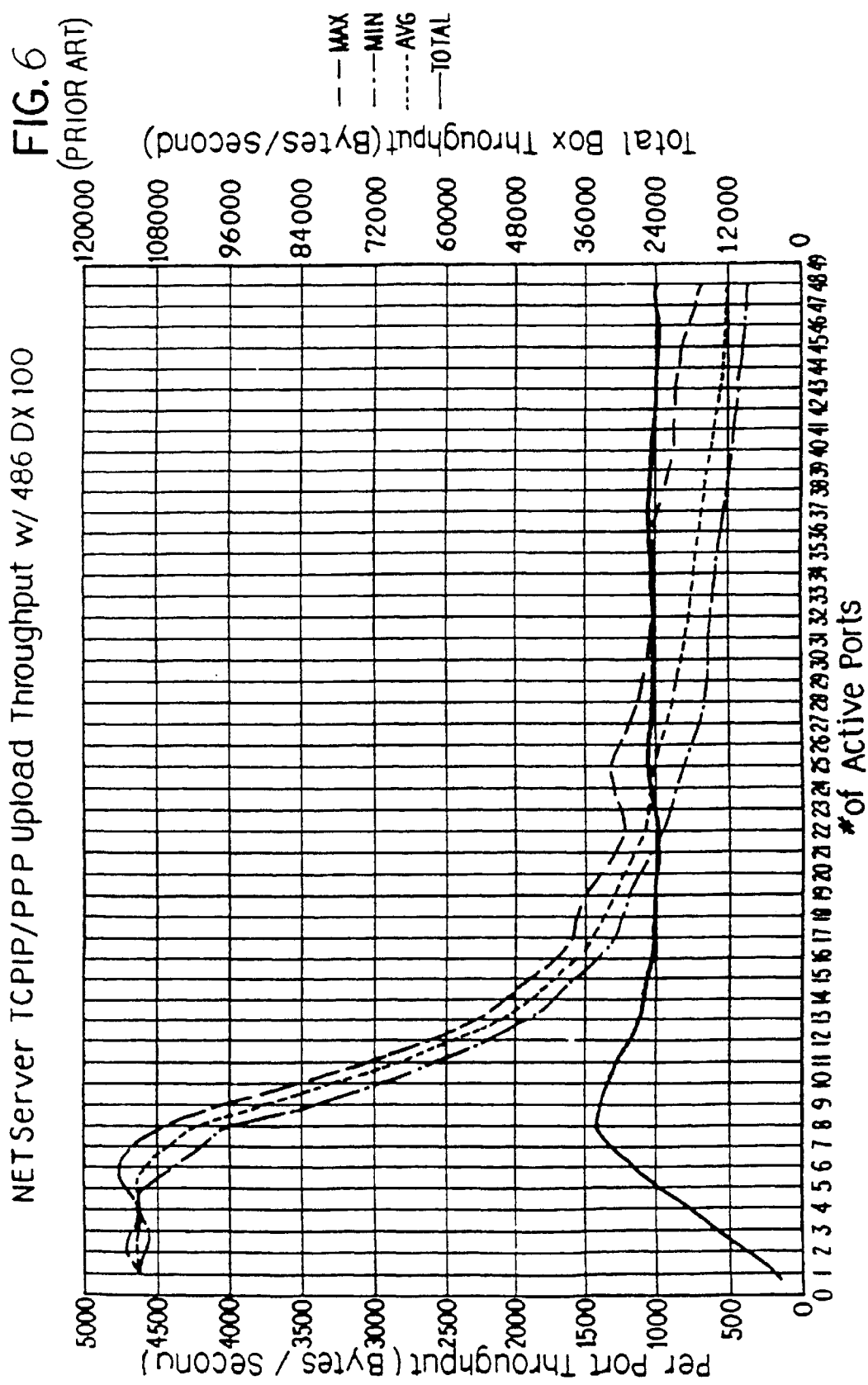
FIG. 6 is a graph of the upload throughput through the network access server of FIG. 3 using prior art processing in a single platform at the network gateway for performing PPP processing.

One representative example illustrating the advantages of the invention in terms of throughput over the prior art methods can be seen if FIGS. 6–9. FIG. 6 is a graph of the upload throughput using prior art PPP protocol processing in a single platform at the network gateway. Note that the total throughput of the network access server remains substantially constant after a peak is reached with 8 active ports and levels out at 17 active ports at 24,000 bytes per second. The per port throughput starts off quite high at roughly 4600 bytes per second for a small number of active ports (that is, less than 10), but drops dramatically at higher numbers of active ports. Thus, FIG. 6 illustrates the processing "bottleneck" that occurs when the PPP protocol processing is performed in a single platform at the network interface.

Figure 7:
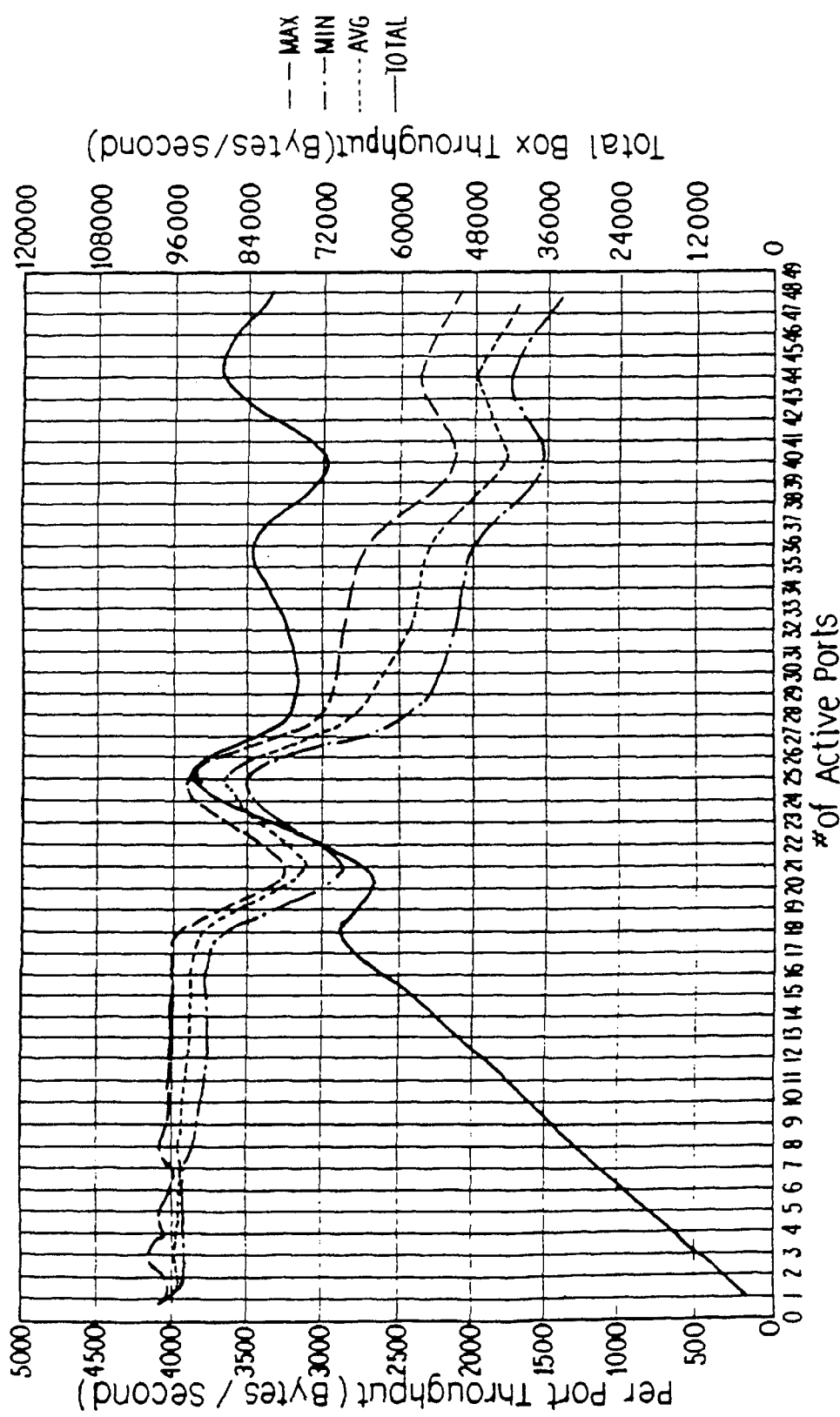
FIG. 7 is a graph of the upload throughput through the network access server of FIG. 3 when the distributed processing technique according to the teaching of the present invention is used.

FIG. 7 is graph of the upload throughput when the distributed processing technique according to the teaching of the present invention is used. Note that in FIG. 7 the total throughput rises steadily up to 18 ports, dips slightly between 18 and 21 ports, and then increases up to total throughput of approximately 92,000 bytes per second with 25 active ports. Between 25 and 48 active ports, the total throughput remains between roughly 72,000 bytes per second and 86,000 bytes per second. This is approximately 3 to 4 times the total throughput as compared to the results of FIG. 6. Further improvements in system tuning would smooth out the oscillations in system throughput shown in FIG. 7, especially for higher numbers of active ports. Note also that the average per port throughput using the techniques of the present invention remains relatively high as the number of active ports increases, accomplishing an efficiency improvement of more than 3 times compared to the results of FIG. 6, particularly at higher volumes of active ports.

Figure 8:
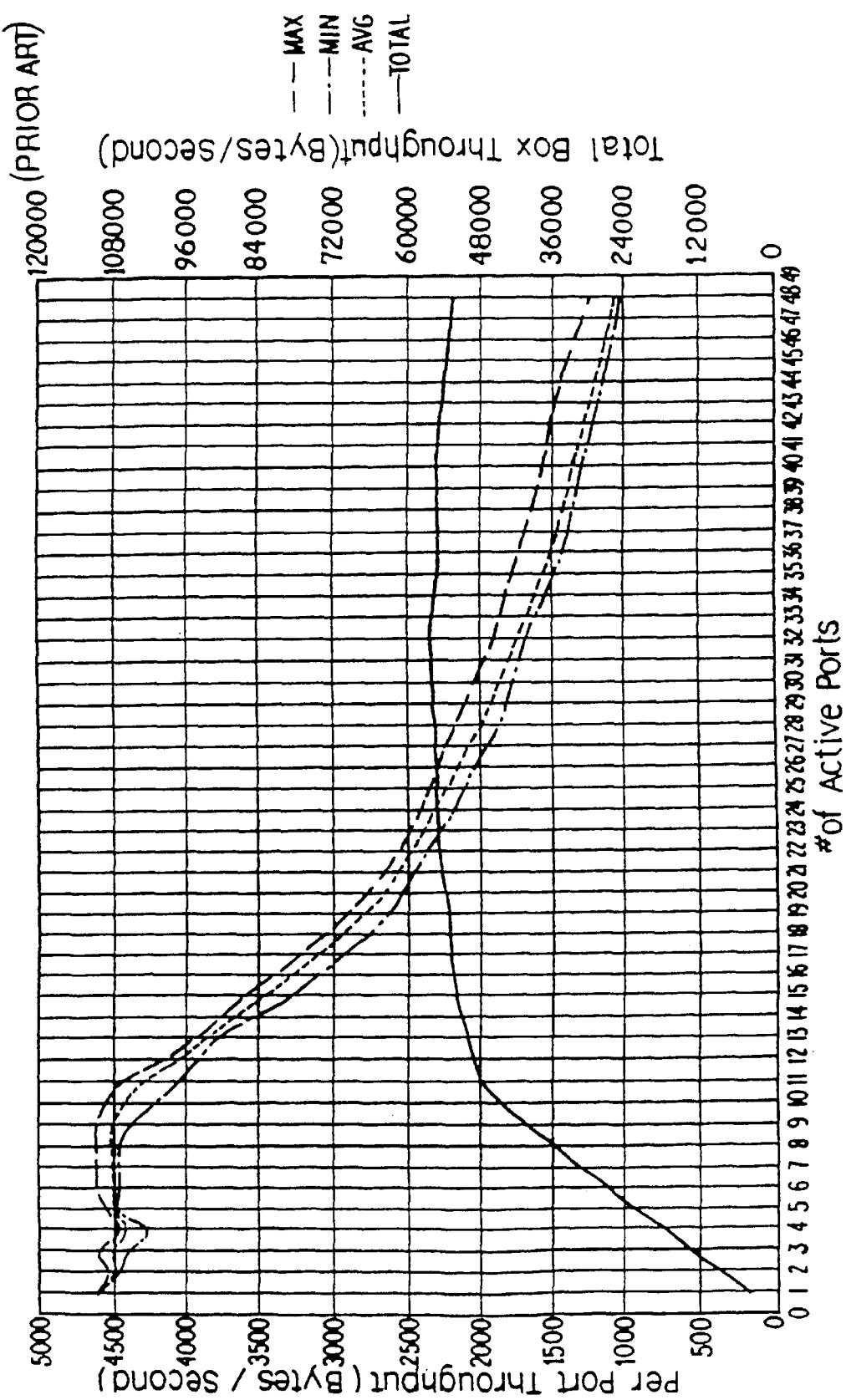
FIG. 8 is a graph of the download throughput through the network access server of FIG. 3 when the PPP processing is performed according to the prior art technique at a single platform at the network gateway.

FIG. 8 is a graph of the download throughput when the PPP processing is performed in the prior art technique of a single platform at the network gateway. In FIG. 8, note that the total download throughput levels off at approximately 55,00 bytes per second between above 20 active ports when the prior art techniques are used. The average per port throughput starts at roughly 45,000 bytes per second with under 10 active ports, but this value drops steadily to a low of approximately 12,000 bytes per second when 48 active ports are used.

Figure 9:
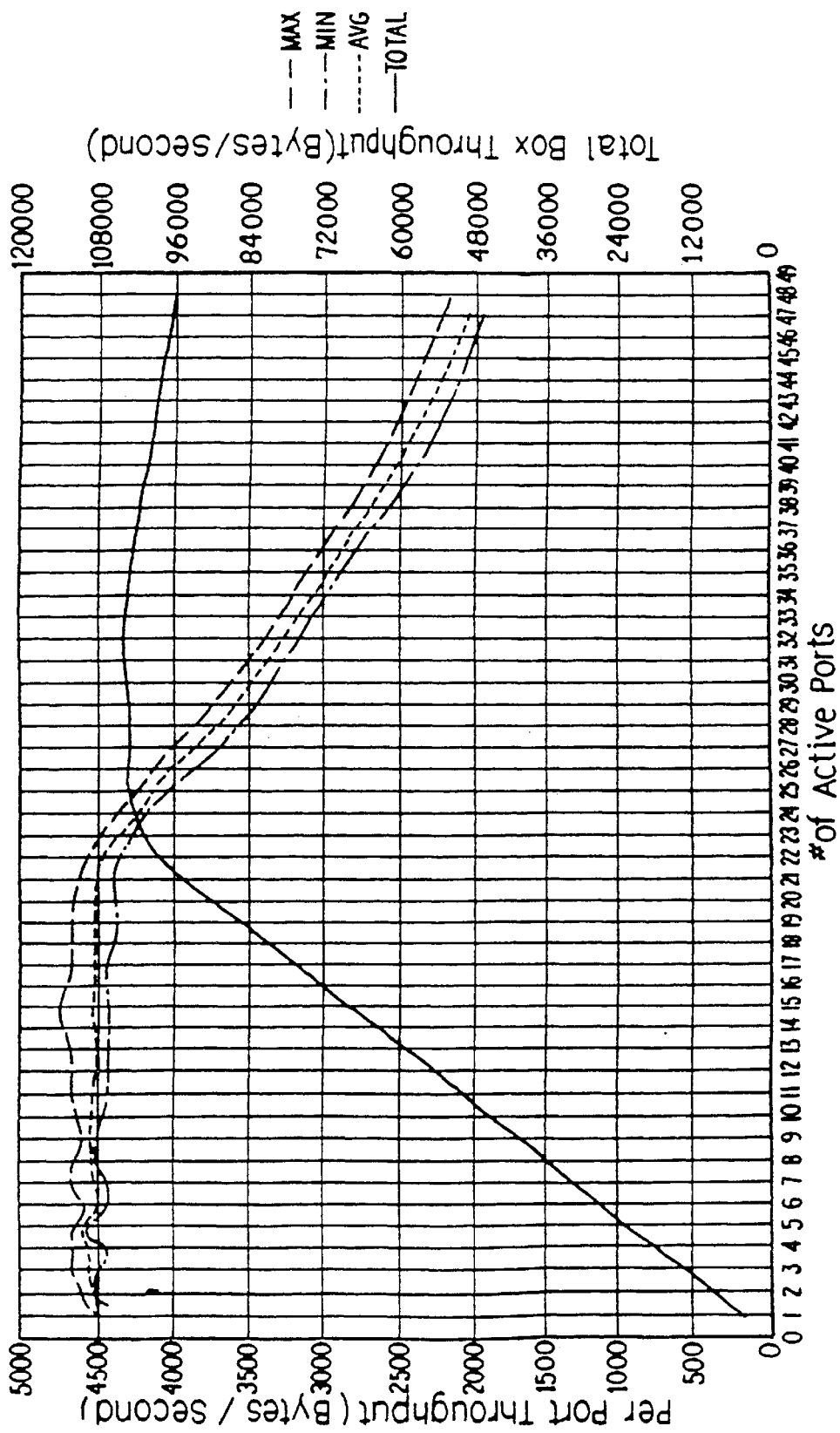
FIG. 9 is a graph of the download throughput through the network access server of FIG. 3 when the distributed processing technique according to the teachings of the present invention is used.

FIG. 9 is a graph of the download throughput when the distributed processing technique according to the teachings of the present invention is used. Note that the total download throughput rises steadily to a high of approximately 104,000 bytes per second when 26 active ports are used and remains relatively constant at higher levels of call activity. As can be seen by comparison of FIG. 9 to FIG. 8, this is a substantial improvement in call throughput. The average per port throughput using the techniques of the invention remains relatively constant at 4500 bytes per second up to 22 ports and this value drops gradually to approximately 2000 bytes per second when 48 ports are used. This represents an improvement of approximately 2 to 1 over the download per port throughput, particularly at high call volumes.

Presently preferred software routines for implementing the procedures shown in FIG. 4 and FIG. 5 are set forth in code form in the Appendix to the above-referenced published PCT application. A person of ordinary skill in the art will appreciate that the code represents but one example of the implementation of the invention in a network access server environment. The code is stored and executed in the modem DSPs of the modem modules 76 of FIG. 3. The software routines in the gateway module 82 that interact with the modem software routines comprise straightforward higher level control routines, with which can be readily developed by persons of ordinary skill in the art.

Distributed Processing of RTP and RTCP Protocols in High Density Network Access Server An alternative embodiment of the invention, involving distributed processing of RTP and RTCP, will be described below in conjunction with a high density version of a network access server. It will of course be readily apparent that the distributed processing of RTP and RTCP can be performed in the network access server of FIG. 3, and the PPP and SLIP distributed processing can also be performed in the embodiment described below.

Figure 10:
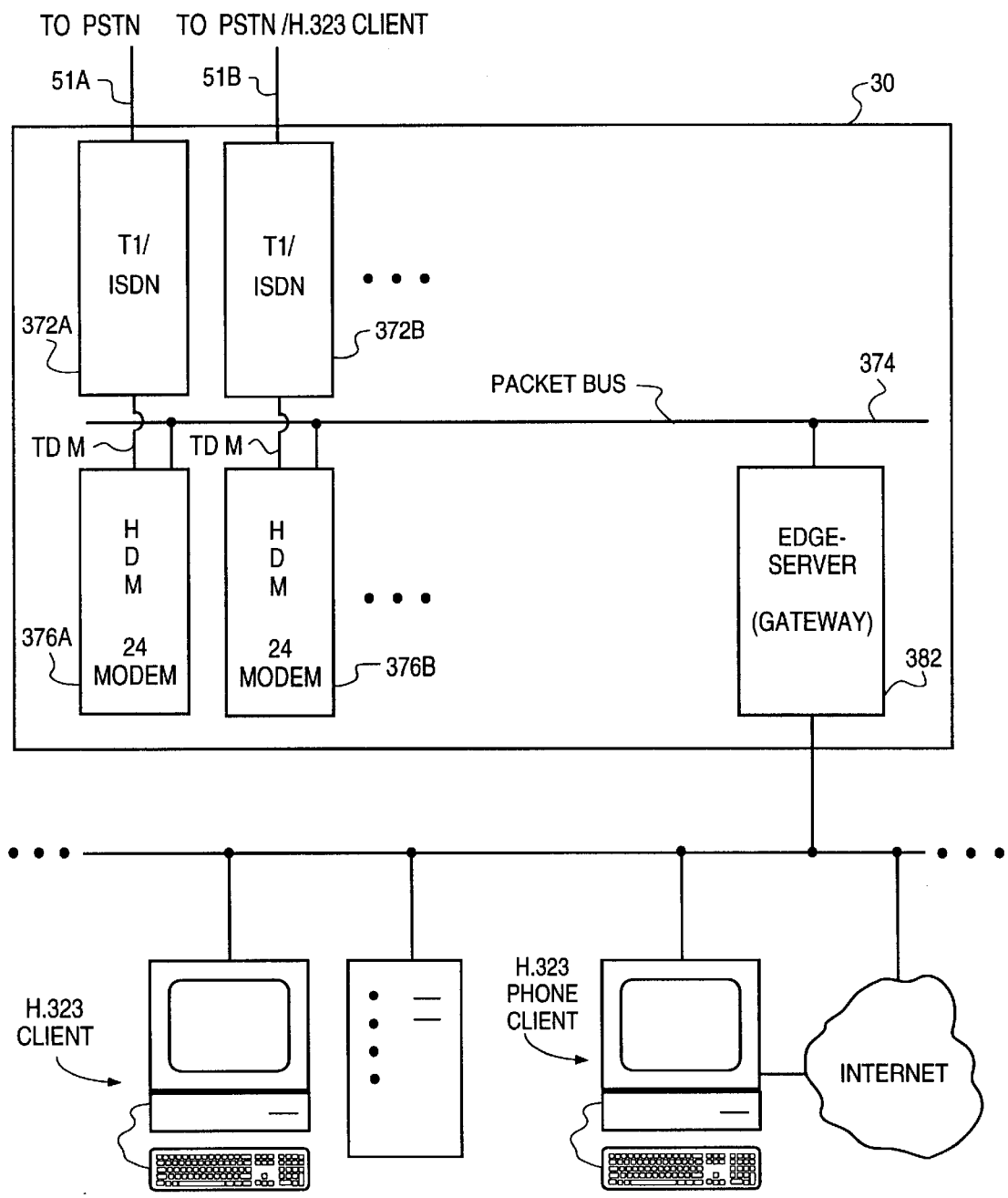
FIG. 10 is a block diagram of a high density network access server which may be used to perform the distributed processing of the present invention.

The architecture of the alternative network access server 30 embodiment is shown in FIG. 10. The embodiment of FIG. 10 is a high density network access server, in that each general purpose DSP or modem card 376A, 376B, etc. contains a high density DSP configuration capable of handling 23, 24 or 30 DS0 channels, instead of four DS0 channels per modem card in the embodiment of FIG. 3. By providing a set of high density modem cards 376 and a robust computing platform in the network gateway 382, a single chassis can process many hundreds of calls through the device simultaneously, as compared to 24 or 48 calls in the embodiment of FIG. 3. The term "HDM" for the DSP cards 376A, 376B etc. in FIG. 10 is an acronym for "high density modem," indicating that each card performs modem functions for a large number of channels on the telephone line, such as 23 B channels plus 1 D channel for an ISDN Primary Rate Interface, 24 DS0 channels for a T1 line and 30 channels for an E1 line.

In the embodiment of FIG. 10, each DSP card 376 has its own T1/ISDN telephone line interface 372 connected to an ISDN PRI or T1 line. The T1/ISDN telephone line interface 372 is similar in architecture and function of the interface 72 of FIG. 3 and set forth in the Walsh et al. '595 patent, and is connected to the high density modem cards by a TDM bus, as described in detail in the Walsh et al. '595 patent. An alternative would be to provide a plurality of T1/ISDN telephone line interfaces 72 and distribute DS0 channel data to the modems via a TDM bus with extra highway lines, as described above in the embodiment of FIG. 3.

The high density DSP cards 376 are connected to the gateway card 382 via a high speed parallel packet bus 374, similar to that described in the Walsh et al. patent. The number of high density DSP cards 376 and associated telephone line interface cards 372 is essentially arbitrary, but 10 to 24 such cards are typical in a high density network access server application today, providing modem functionality for between 240 and 576 T1 DS0 channels. The HDM cards are described in detail below.

The gateway or EdgeServer™ card 382 consists of a general purpose computing platform (such as an IBM PC) running a stand alone or shareware network operating system such as Windows NT™ from Microsoft Corporation or UNIX. The card 382 contains software and hardware modules to perform call routing, modem configuration and other features as set forth and described for the gateway modules in the Walsh et al. '595 patent and the Baum et al. patent, U.S. Pat. No. 5,577,105, also incorporated by reference herein. Further details on the design and features of the EdgeServer™ card 382 are set forth in the patent application of William Verthein et al. Ser. No. 08/813,173, the contents of which are incorporated by reference herein.

The network access server 30 shown in FIG. 10 is useful for a number of different types of applications, such as Internet access, remote access to corporate backbone networks, video and audio conferencing, Internet telephony, digital wireless Internet and corporate network access, to name a few. In an Internet telephony embodiment, the product provides a facility for users to engage in long distance telephone, audio/visual and/or data sessions using the Internet as the transport medium rather than the long distance public switched telephone network of the inter exchange carriers. Users realize a substantial savings in transmission charges as compared to phone charges.

A standards-track protocol has been develop by the industry to provide end-to-end delivery for data with real-time characteristics, such as audio, video, and simulative data, over multicast or unicast network services. This protocol is described in detail in a publicly available document known as RFC 1889, January 1996, the entire contents of which are incorporated by reference herein. In the RTP, the data transport is augmented by a control protocol referred to as RTCP (Real-time Transport Control Protocol) to allow for monitoring of the data delivery in a manner scalable to large multicast networks, and to provide control and identification functionality. The RTP and RTCP are designed to be independent of the underlying transport and network layers in the OSI model. In one representative embodiment of the invention described below, the processing of the RTP and RTCP protocols for each call passing through the network access server 30 is distributed between the gateway or EdgeServer card 382 and the DSP platform in the HDM cards 376.

The RTP has header fields that are either fixed or deterministically varying, with a certain format described in the RFC 1889 document. These fields include fields for a sequence number, timestamp, synchronization source identifiers, and contributing source identifiers. The header can be extended with RTP header extension to provide new payload-format-independent functions that require additional information to be carried in the RTP data packet header. Additionally, the RTCP packets have a packet format and header fields for control information.

The network access server 30 of FIG. 10 is an ideal platform in which to direct calls between remote and network endpoints of a call using RTP. The software and hardware functionality of the HDM DSP platform and the EdgeServer platform is distributed in the manner shown in FIG. 11. The telephone line interface cards 372 of FIG. 10 perform PSTN access functionality, including T1 signaling, call supervision (E&M, Loop Start, Ground Start), time slot routing and T1 framing, ISDN signaling and B-channel routing. The HDM cards 376 perform information flow processing, including tagging and delivery of audio and control components, a portion of the processing of the RTP (described below), audio transcoding in accordance with the G.771 standard (or G.723 G.729), and other audio processing functions (e.g., DTMF generation, echo cancellation, etc.). The EdgeServer 382 or gateway platform performs call management, a portion of the RTP processing (described below), H.245 processing, H.225 processing, Internet Protocol (IP) routing, and gateway to HDM coordination protocol processing.

Figure 11:
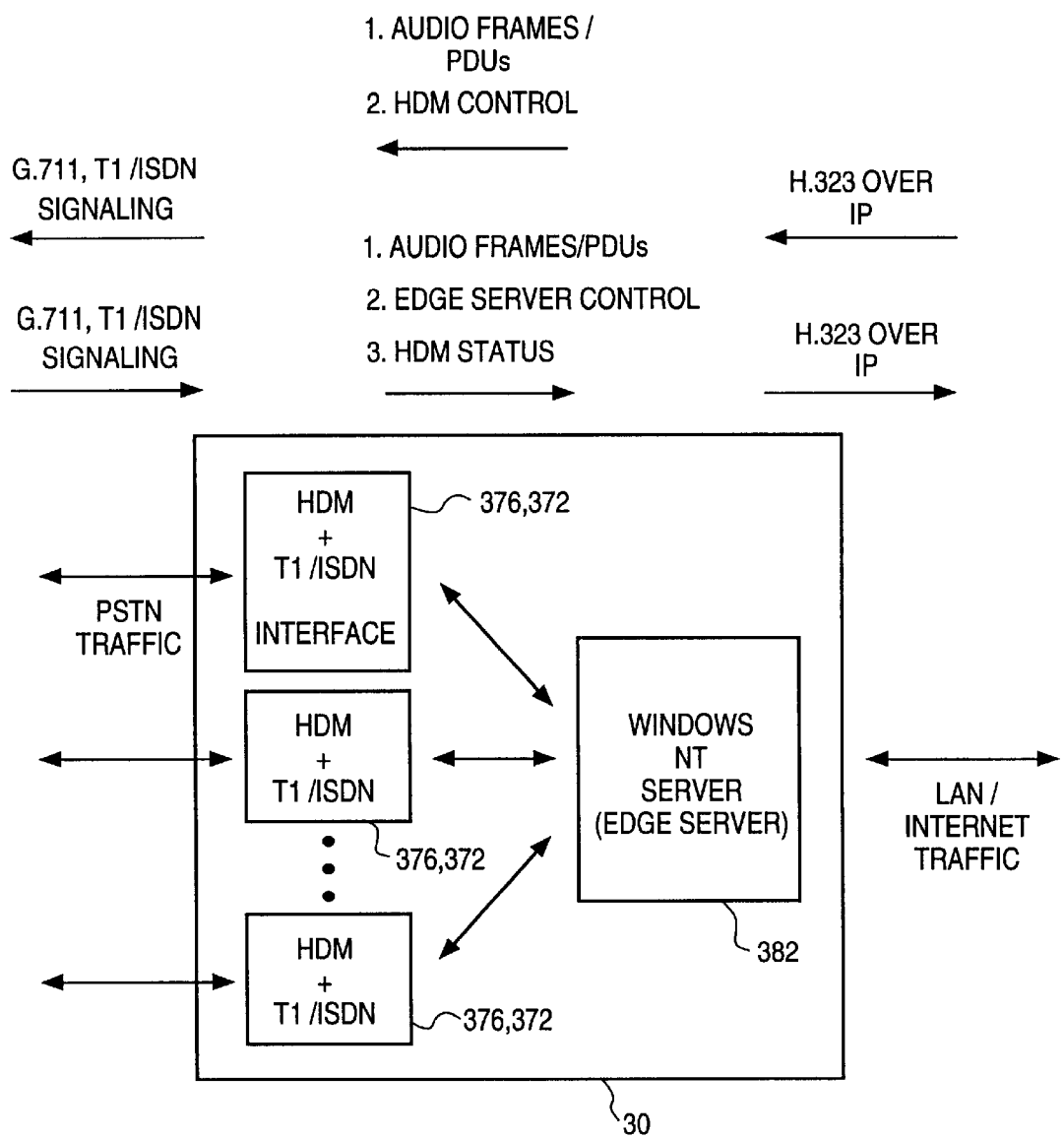
FIG. 11 is a diagram illustrating the distribution of functionality performed by the computing platform in the high density modems cards in the embodiment of FIG. 10, and the functionality provided by the computing platform in the gateway or EdgeServer™ card.

The arrows above the blocks in FIG. 11 indicate specific data forms for an Internet telephony session that are directed between the telephone line interface card 372, HDM DSP card 376, and EdgeServer card 382 for both inbound and outbound data. For data going between the packet switched computer network and the PSTN (referred to herein as outbound data), asynchronous H.323 over IP data is received at the EdgeServer card 382. Audio frames/Protocol Data Units (PDUs) and modem control information is passed in packet form from the EdgeServer card to the high density modem card via the packet bus 374 (FIG. 10). The HDM DSP platform in the card 376 performs additional RTP processing and other audio processing described herein, including jitter buffering, G.711, G.723 and G.729 transcoding, and T1/ISDN signaling. The data is sent in PCM (pulse code modulated) form from the HDM card to the telephone line interface 372 over the TDM bus (FIG. 10), framed into T1 or ISDN PRI frames, and sent on the PSTN for transmission to the destination.

Figure 12:
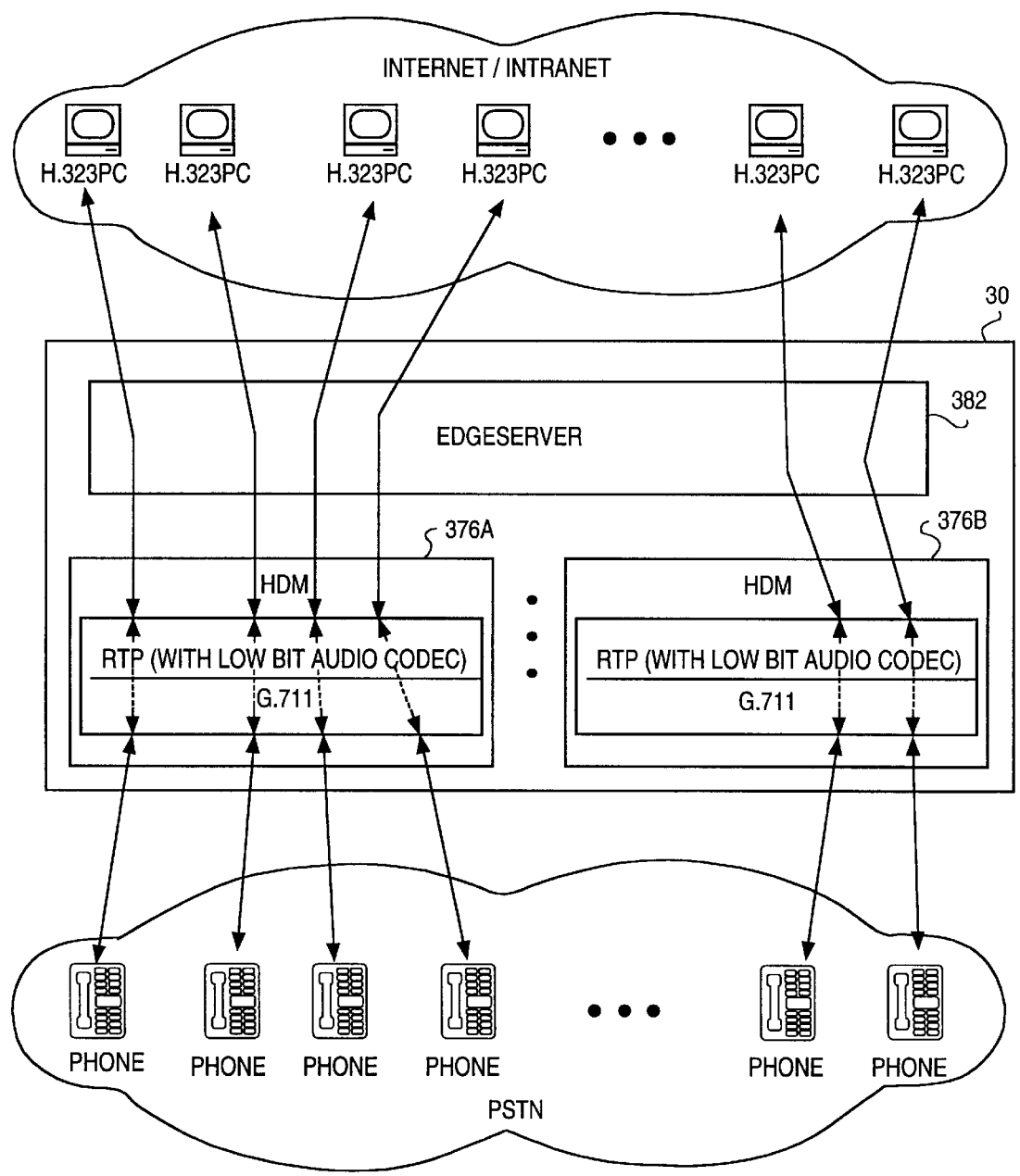
FIG. 12 is a high level diagram of the distributed processing architecture for the RTP protocol in the network access server embodiment of FIG. 10.

FIG. 12 is an overview illustration of a presently preferred distributed RTP processing architecture for the network access server embodiment of FIG. 10. Sources of audio/video or other real time data, such as a plurality of H.323 personal computers, are located on the packet switched LAN or WAN connected to the network access server. The data from the H.323 PCs comes into the EdgeServer cards as LAN traffic (over IP).

In one embodiment, the EdgeServer card 382 handles all RTP functionality, with the exception of jitter buffer and all frame-based audio processing and generation of RTCP send and receive reports, which are performed in the HDM card 376 platforms. The actual processing performed by the EdgeServer 382 includes the handling of the creation and destruction of the audio streams as directed by the H.245 and H.225 protocol. Additionally, the gateway or EdgeServer card 382 acts as a central coordinator for the RTP streams and provides the HDMs with all the information that they need to provide their part of distributed RTP functionality. (In one possible variation, the gateway card 382 also terminates all RTCP traffic, including termination and generation of sender reports and receive reports. IP, UDP and RTP headers are placed onto all audio frames sent to the LAN. The EdgeServer 382 fills in all RTP header fields that change on a dynamic basis.) The EdgeServer also provides a translation function for software interfaces between the EdgeServer card 382 and the LAN interface, and between the card 382 and the packet bus 374. In one possible variation, the RTCP processing is distributed between the computing platform in the card 382 and the HDM card 376 platform, such that information for the send and receive reports for RTCP comes from the HDM platform. The actual send and receive reports may be sent out by either the HDM modem platform in the cards 376 or by the computing platform in the gateway card 382.

Still referring to FIG. 12, the HDM 376 digital signal processor computing platform handles the processing of the RTP jitter buffer and all lower level audio processing that occurs below this level, including DTMF generation, echo cancellation and transcoding. The actual processing that is encompassed within the HDM platform includes a coordination function with the Edgeserver card to respond to its setting up new RTP session, or tearing down old sessions; providing a jitter buffer to remove any arrival jitter; perform all RTP header encapsulation and de-encapsulation functions; perform all IP and UDP header encapsulation and de-encapsulation functions; and reacting to changing Internet/Intranet conditions by changing the size of the jitter buffer.

Figure 13:
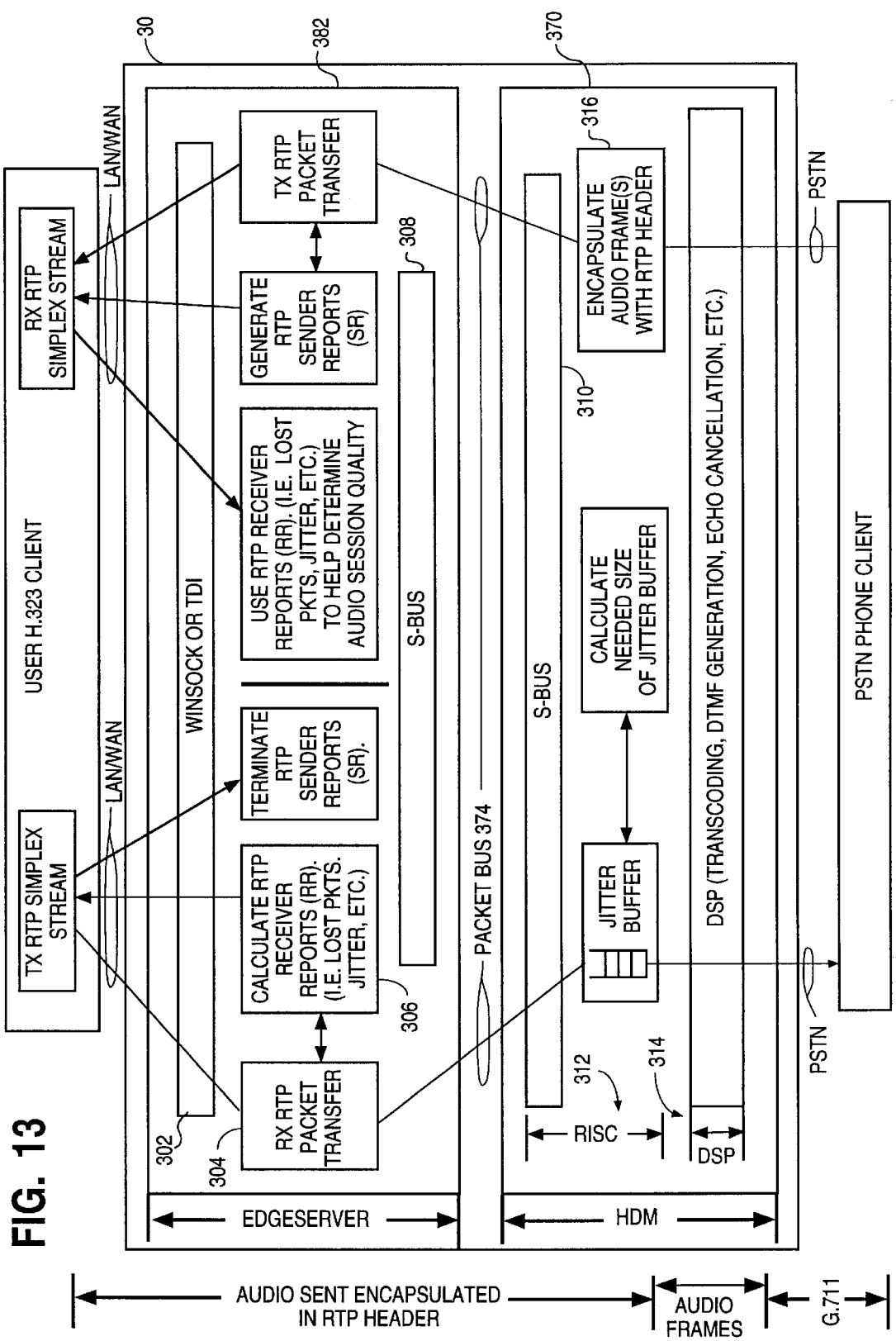
FIG. 13 is a more detailed diagram of the distributed processing of the RTP protocol in the network access server of FIG. 10, showing the processing performed at the EdgeServer platform and the processing performed in the modem platform.

An embodiment of distributed processing of RTP functionality between the EdgeServer and the HDM cards is shown in more detail in FIG. 13. The left hand margin shows the form in which data (such as audio data) is transmitted between the user H.323 client on the computer network and the PSTN phone client linked to the network access server via the PSTN. As can be seen in the Figure, audio is sent encapsulated in an RTP header from the H.323 client all the way into the HDM platform 376. The HDM platform 376 removes the RTP headers and performs jitter buffering in a jitter buffer, with the size of the jitter buffer dynamically changed in order to deal with the bursty, asynchronous nature of packet switched data from the computer network. The modem platform 376 also performs lower level DSP processing of audio frames, including transcoding, echo cancellation, and DTMF generation. The audio data is transcoded according to the G.711 standard and sent over the PSTN to the phone client.

Still referring to FIG. 13, the outbound data from the LAN is translated through a network interface software structure 302 (WinSock, BSD sockets or TDI), the details of which are not important and readily derived by persons of skill in the art. A receive RTP packet transfer module 304 operates with a Calculate RTP Receiver Reports module 306 and advises the user H.323 client of the number of lost packets, size of the jitter, and other information per RFC 1889. The audio data encapsulated in RTP header is translated by the S-Bus interface software structure 308 (described below) and sent over the packet bus 374 (FIG. 10) to the HDM modem cards 376.

A reduced instruction set central processing unit (RISC) computing platform in the HDM card implements a similar S-bus interface software program 310 and receives the RTP audio data, and performs the jitter buffering (described below). The RISC computing platform 312 calculates the needed size of the jitter buffer based on LAN/WAN conditions and any intrachassis latency. The RISC computing platform 312 removes all RTP headers and passes audio frames to the DSP computing platform 314 in the HDM card. The DSP platform performs other lower level audio processing, including DTMF generation, echo cancellation, and ultimately the G.711, G.723 and G.729 transcoding. The inbound processing is as described in FIG. 13, with the encapsulating of audio framing with RTP headers performed by module 316.

While the embodiment of FIG. 13 shows the processing of RTCP send and receive reports on the EdgeServer card 382, it may readily be shifted to the high density modem platform in the HDM card 376. For example, the RTCP protocol processing may be distributed among the gateway platform and the DSP platform in the HDM card, for example the information for the RTCP send and receive reports comes from the modem platform but the actual send and receive report may be generated and sent out by either the DSP platform in the HDM card or at the gateway card 382.

Figure 14:
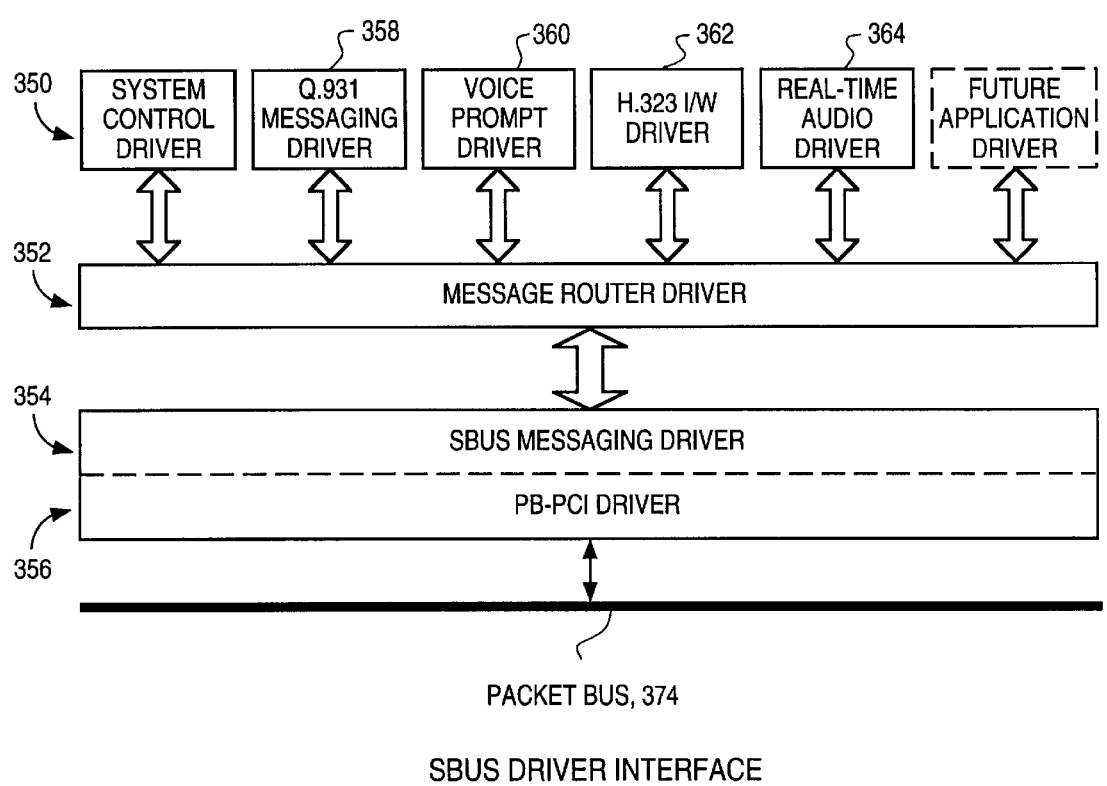
FIG. 14 is a illustration of the layers of the S-Bus driver interface controlling the transmission of messages and data between the EdgeServer card and the modem card.

Referring now to FIG. 14, the software architecture for the S-BUS driver interface for the EdgeServer card 382 is illustrated in block diagram form. The interface consists of four driver layers dynamically linked together: application drivers (system control, Q.931 messaging, Voice Prompt, H.323 interworking, and Real-time Audio); a message router driver 352, an S-BUS messaging driver 354 and a packet bus (PB)-PCI driver 356.

All application drivers 350 receive and transmit their message via the message router driver. The message router driver is the holding place for various message types such as audio, data and control, which are queued into three corresponding transmit or receive priority queues. The system control driver interfaces with the message router driver to send requests and receive events to and from the SBUS message driver 354. The system control driver acts as a module-to-module communication for the underlying EdgeServer components. The module-to-module communications include the following types of messages:

Call establishments—Call establishment messages are used to signal the HDM or System Control of various call establishment requests and responses. For example, Dial-out, Answer Call, Disconnect Call, Connection Failed/Succeeded, and Incoming Call.

Call maintenance—Call maintenance messages are used by the System Control to request HDM's statistics in real-time. Likewise, the HDM responds back to the System Control with the appropriate message.

Resource management—Resource management messages are used by the System Control to request various HDM's resource information. For example, availability of HDMs and its number of ports/channels, DSPs utilization, and its number of DSPs available for transcoding. Likewise, the HDM responds back with the appropriate resource information.

Configuration—Configuration messages are used by the System Control to send configuration messages to an HDM to add and/or modify the flavor of a connection. For example, Enabling/Disabling HDM Ports.

Diagnostic—Diagnostic messages are used by the System Control to request a specific test to be executed at the HDM level in conjunction with the associated EdgeServer's test code. For example, various level of loopbacks at the HDM's hardware components, client's terminal loopback, and measuring round-trip delay.

The Q.931 Driver 358 is responsible for sending Q.931 messages to HDM and processing receive Q.931 messages from the HDM. Q.931 is a message-oriented control protocol for call setup/tear-down in the ISDN environment. All Q.931 messages are control messages which will be processed by this driver and the HDM.

Voice Prompt driver 360 is an optional driver and manages the record, store and play back of voice prompts.

The H.323 Interworking Driver 362 interfaces to the Message Router Driver to send requests and receive events to and from the SBUS Message Driver. The H.323 Interworking Driver relationship with the SBUS drivers is to communication the following message type between the EdgeServer and HDM:

Audio Mode Exchange with HDM.

Open an Audio path between SBUS drivers and Real-time Audio Transfer Driver.

All H.323 interworking messages are control messages which will be processed by this driver and the HDM or SBUS drivers. The Real-time Audio Driver 364 sends and receives packetized audio via SBUS Messaging driver. Audio packets are enqueued and dequeued in the audio queue of the Message Router 352. The Message Router Driver 352 is an intermediate driver in kernel-mode which connects to the Application drivers above it and the SBUS Messaging Driver 354 below it. The Message Router 352 provides the interface to support the various multimedia message types (audio, data, and control) that are communicated between the Application drivers on the EdgeServer and the HDMs. Each multimedia message that is received from the HDM, the SBUS Messaging component parses the packet's multimedia header to distinguish its priority level and pass this message to the appropriate Message Router's priority queue. From this queue this driver passes the multimedia message to the appropriate Application Driver 350 based on the application ID in the multimedia header. Likewise, the Message Router 352 transmits the multimedia messages from the Application Drivers 350 to the SBUS Messaging's 354 transmit priority queues. The Message Router 354 communicates to the HDM using the hardware and data link services of the SBUS drivers.

The PB-PCI driver component 356 is a Windows NT™ driver which interfaces with the packet bus hardware, for the purpose of data delivery between the EdgeServer, HDM and other cards on the network access server 30. The SBUS Messaging component utilizes the PB-PCI driver as a physical level device to transmit and receive messages between the EdgeServer and HDM cards.

Figure 15:
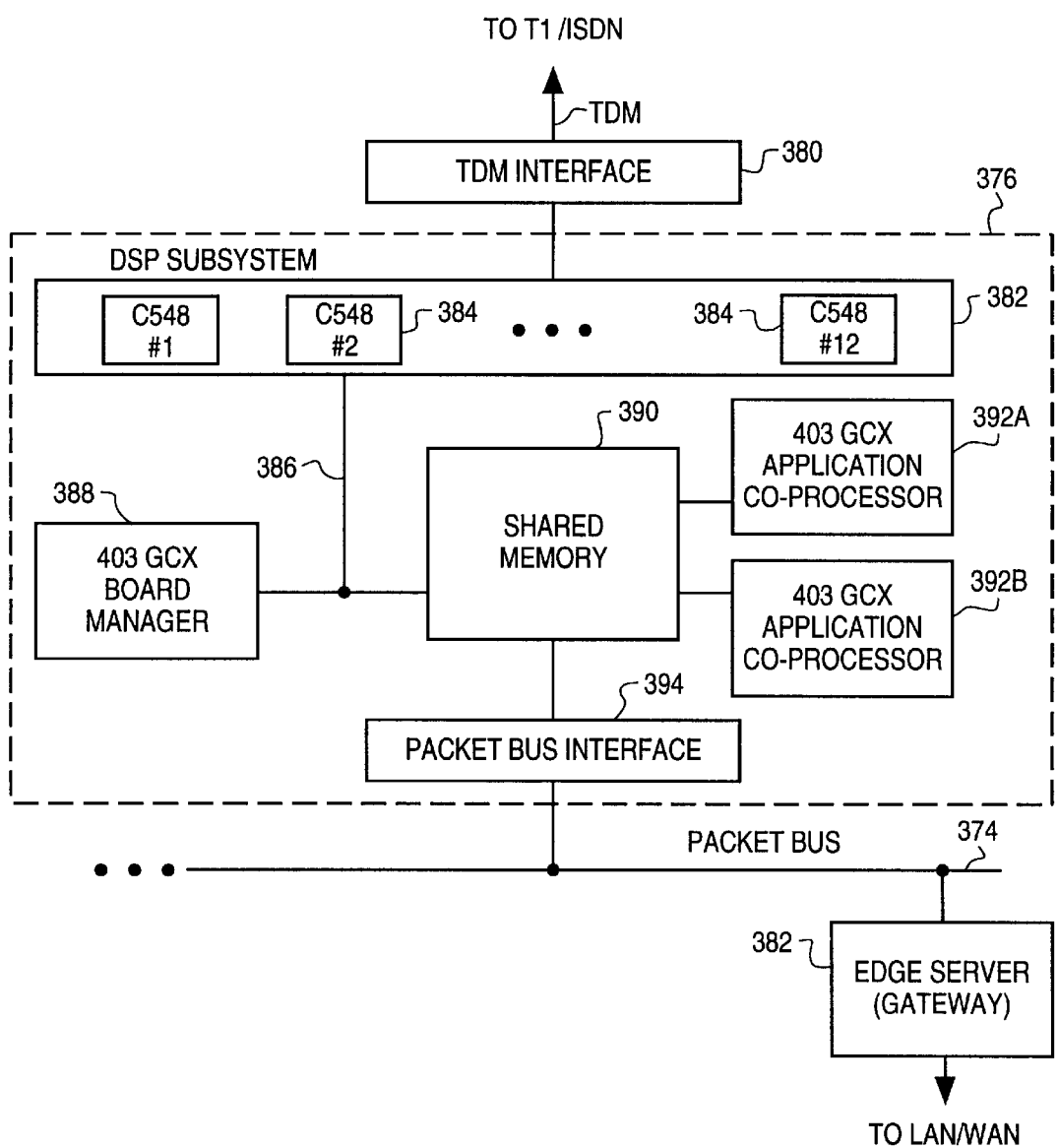
FIG. 15 is an overall block diagram of the hardware for the high density modem cards of FIG. 10.

FIG. 15 is a high level block diagram of the high density modem cards 376. A TDM interface 380 provides an interface to a TDM bus leading to the T1/E1 interface card (see FIG. 10). The details of the TDM bus are known in the art, and the reader is directed to the similar interface in the Walsh et al. patent for the quad modem cards. The DS0 channel data is sent from the TDM interface 380 to a DSP subsystem 382, comprising 12 high performance Texas Instruments TMS3201c548 digital signal processors (DSPs) 384, each DSP supporting bidirectional modem functionality for two separate DS0 channels. The DSP subsystem 382 is connected by a bus system 386 to an IBM PPC403GCx reduced instruction set central processing unit (RISC) 388 functioning as a board manager, and to a shared memory 390. The shared memory 390 is connected to two additional IBM PPC403GCx RISC application co-processors processors 392A and 392B, and to a packet bus interface 394. The RISC co-processors 392 perform the functions illustrated in FIG. 13. The hardware details of the packet bus interface 394 are conventional and described in the Walsh et al. patent.

The following summarizes some of the major functions for the network access server performed by the high density modem card 376:
ISDN Signaling
PSTN (Channelized T1) Signaling
Resource Management
Data Path Setup and Thread Management
Flow Control
Packet Bus/S-Bus Processing
RTP/UDP/IP Header Processing
Jitter Estimation and Dejittering
Packet Sequence Re-ordering
Audio Packetization
Audio Transcoding
Echo Cancellation
Automatic Gain Control
DTMF Tone Generation Most of the above functions are conventional and well known in the art. The functions relating to RTP processing are described in detail below.

In the illustrated embodiment, one HDM card support 24 calls (i.e., a T1 span). Therefore the HDM architecture is based on the HDM 24/30 hardware architecture consisting of 12 high performance Texas Instruments TMS3201c548 DSPs and 3 IBM PPC403GCx RISC processors. An alternative embodiment for a 30 channel carrier, such as E1, would include a daughter board which supports four additional C548 DSPs, thereby providing some redundancy in the DSP engines.

The HDM is an evolution of the digital modem technologies found in the Walsh et al. patent, providing a highly integrated processing solution for purely digital configurations of a network access server. The HDM does not support RS-232 and POTS interfaces. The existing HDM 24/30 will terminate both analog modulations, via A-law or u-law PCM encoded data, and ISDN calls such as V.120, X.75, or Async to Sync PPP at 64 Kbps/56 Kbps or V.110 from 300 bps to 38.4 Kbps.

As noted above, the HDM 24/30 NAC is designed to interface to the telephone line interface card that provides a direct interface to either a T1 or E1 span. There are two types of T1 signaling functions supported in the HDM: channelized T1 and PRI. For channelized T1, the HDM supports 24 DS0 channels; for PRI, the HDM supports 23 B-channels and 1 D-channel; for E1 the HDM supports 30 B channels and 1 D-channel.

Figure 16:
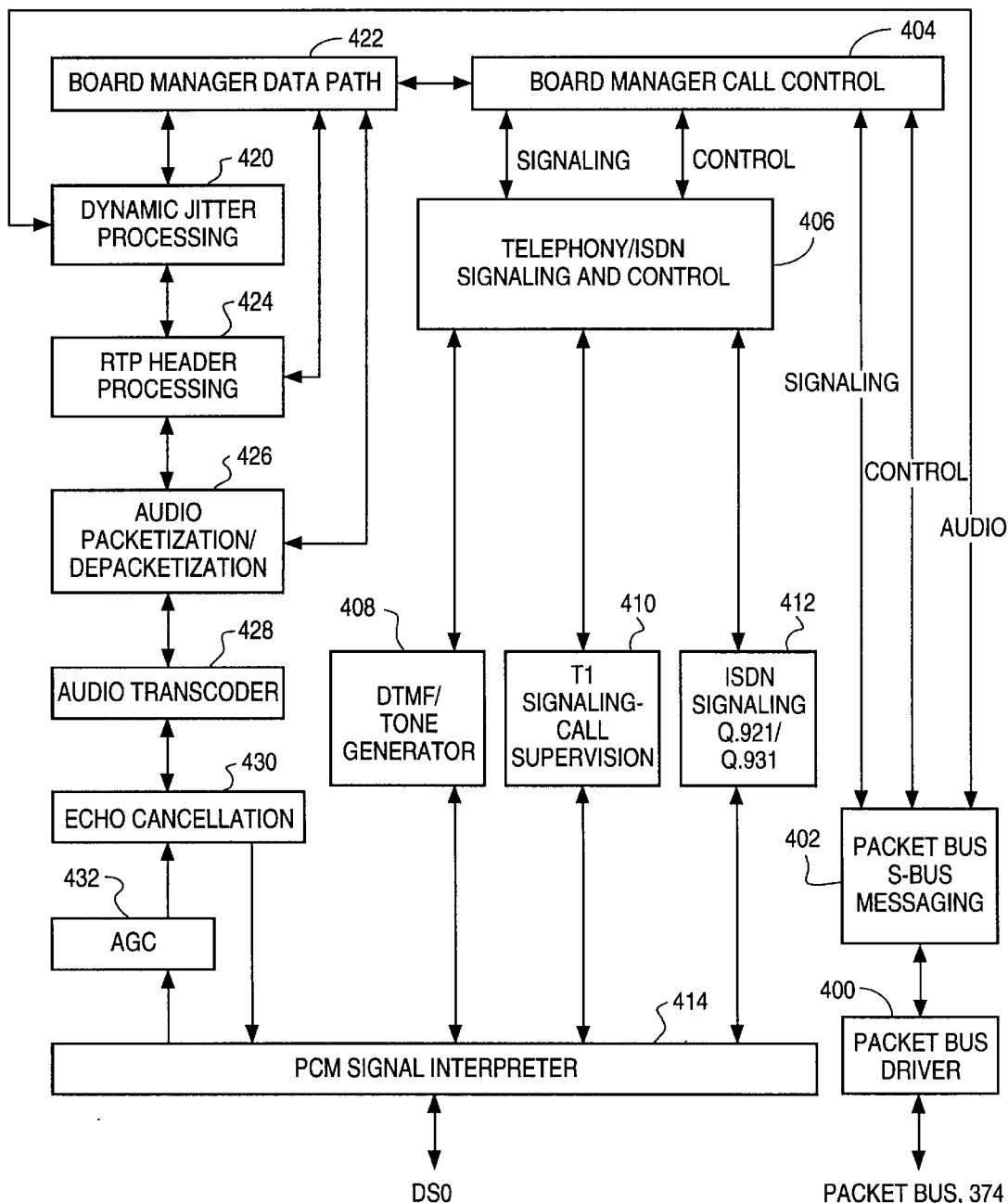
FIG. 16 is a diagram of the software architecture for the high density modems.

FIG. 16 is a block diagram of the software architecture of the HDM 376. The software is designed to support both call control processing and data processing. A packet bus driver module 400 interfaces with the packet bus 374 (see FIG. 10) to receive and transmit packets of data between the HDM and the gateway or EdgeServer card. A Packet bus S-BUS messaging routine resides above the packet bus driver and performs translation of S-BUS message fields from the EdgeServer. Control and signaling data is sent to the Board Manager call control module. Signaling and call control for telephony and ISDN calls are separated and sent to a signaling and control manager 406, which supervises a DTMF or other tone generator 408, a T1 signaling-call supervision manager 410, and an ISDN Q.921/Q.931 signaling manager 412. The signaling and call control data is sent to a PCM signal interpreter/transcoding module for required signal conversion into DS0 channel data.

In the HDM, audio data is passed from the Packet Bus S-BUS messaging module 402 to a dynamic jitter processing module 420 for removing jitter in the audio stream. A board manager data path module 422 supervises the jitter processing, RTP header processing, and audio packetization and depackatization functions, performed by modules 420, 424 and 426, respectively. An audio transcoder module 428 resides below the audio packetizing and depacketizing module for performing G.711 transcoding. Below the audio transcoder, an echo cancellation module 430 and an automatic gain control (AGC) module 432 perform lower level processing. The audio data is passed to the PCM signal interpreter module 414 and forwarded to the T1/ISDN telephone line interface 372 (FIG. 10) as DS0 data for framing and transmission on the telephone line to the destination.

Figure 17:
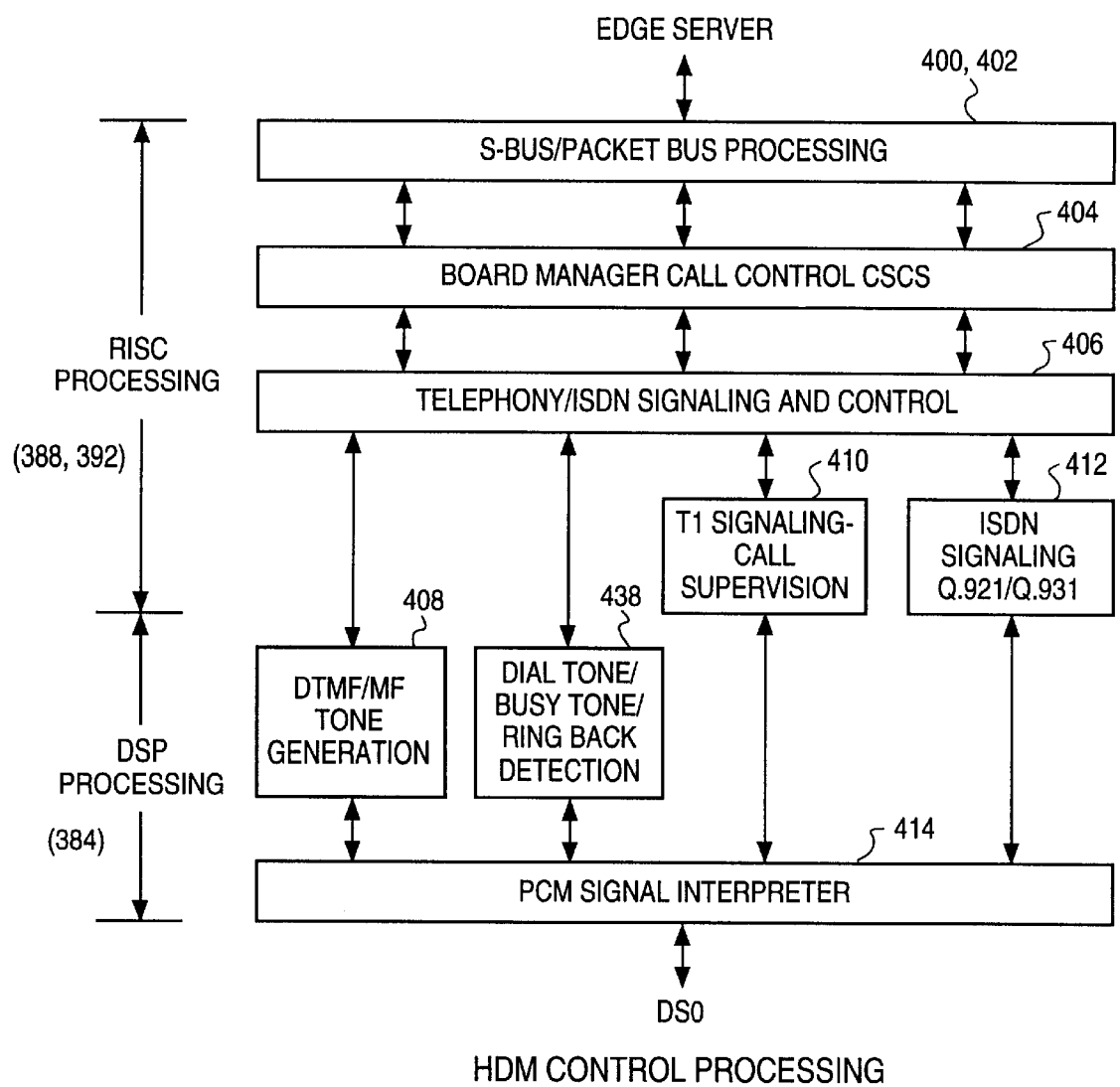
FIG. 17 is a block diagram of the control processing architecture for the high density modems, showing the division of processing between the RISC chips and the DSPs.

The call control processing performed by the HDM is shown in FIG. 17. The 403GCX RISC chip platform 388, 392A, B (FIG. 15) performs the required S-BUS/Packet Bus processing 400, 402 for inbound and outbound data between the HDM and the EdgeServer, the board manager call control module 404, the telephony/ISDN signaling and control processing as indicated in the Figure. The DSP platform performs the DTMS/MF tone generation and call signaling tone detection 438. The DSP platform also implements the PCM signal interpreter module 414.

Referring to FIG. 18, the HDM data processing for the HDM is shown in block diagram form. As can be seen, the distribution of functionality between the RISC processing and the DSP processing is slightly different for inbound and outbound data. For inbound data, the DSP performs processing required at the TDM interface, AGC, echo cancellation and audio transcoding. Audio packetization and the addition of RTP/UDP/IP headers for the data is performed by the RISC chips, as is the S-BUS and Packet Bus processing.

For outbound data, after the S-BUS and Packet Bus processing by the RISC chips, the DSP assumes the task of performing jitter processing, removing RTP/UDP/IP headers, and audio depacketization, and the lower functions of audio transcoding, echo cancellation and TDM interface processing to produce DS0 channel data for the respective T1/ISDN network interface card.

The major resource in the HDM required for supporting internet telephony in a network access server is the DSP transcoding resource. Based on the system requirements, it is possible to deliver 3 full duplex G.723/G.711 transcoders in each Texas Instruments C548 DSP engine. As a minimum, each C548 DSP (12 per HDM card) is required to handle two full-duplex audio transcoding tasks. FIG. 19A illustrates a HDM/DSP subsystem configuration for such a minimum configuration.

To support an embodiment providing both remote access services and Internet telephony applications, a more flexible and extensible architecture is required. A new DSP architecture can be designed with the goal of creating an extensible architecture which can be migrated to support additional applications and features without significant modifications to the architecture. In such a system, an event-driven DSP architecture that is flexible and robust is preferred, but which fixes the functions that will be supported at the compile time. The DSP resources might be allocated to V.34 tasks, audio CODEC tasks, or any combination that is allowed by the available resources. A proposed event-driven architecture that allows each DSP to perform a mixture type of tasks with the goal to fully utilize the processing power of each DSP engine is shown in FIG. 19B. Ideally, in such an architecture, the goal is to produce an architecture with an operating system that allows multiple functions to run and modularize functionality so that one can modify/add/delete modules with very little modification to the operating system.

RTP/UDP/IP Header Processing Module 424

The RTP/UDP/IP header processing is supported by the application processing layer in the RISC. The RTP/UDP/IP header processing module is responsible for adding the 12 octets of RTP header, 12 octets of UDP header, and 20 octets of IP header to all the audio packets which are transmitted from the PSTN to the LAN. This module is also responsible for removing the RTP/UDP/IP header from the audio packets for data from LAN to the PSTN. The RISC application co-processors also perform PPP/SLIP framing, as well as the RTP/UDP/IP processing.

G.723.1/G.711 Audio Transcoding Module 428

The audio transcoding between G.723.1 and G.711 is required for the DSP subsystem since the G.711 audio stream will always arrive from the PSTN/ISDN clients over T1 and the G.723 compressed stream arrive from the LAN side.

Specifically, the following functions are supported by the DSP subsystem:

Each DSP engine supports 2 concurrent full-duplex G.723.1/G.711 transcoder tasks.

The transcoder implementation is compliant to the G.723.1 and G.711 ITU implementation.

It supports encoder/decoder independence such that one can allocate any combination of encoders or decoders according to system configuration and within the DSP resource limits.

It supports synchronous output to the T1 interface.

Jitter Processing Module 420 and Packet Re-Ordering Module 426

Jitter (as defined previously) can be caused by network congestion external to the network access server 30, or the network access server's internal communication and processing. The network congestion may also cause the packets to arrive in a wrong order, a phenomenon termed a packet sequence disorder. These conditions are ameliorated by the jitter processing module 420 and the packet re-ordering module 426.

The DSP subsystem 382 supports a dynamic jitter processing module 420 where the size of the jitter queue is adjusted during the run time operation. This module 420 will also support the re-ordering of the frame sequence. In addition, the module will support the talk-spurts processing to reduce the bandwidth usage in the LAN.

The RISC application co-processors 392 support an audio packetization function 426. This audio packetization function conform to the ITU H.225 Annex F—new audio packetization for G.723.1. Both 6.3 kbps and 5.3 kbps rates are mandatory part of the G.723.1 encoder and decoder. A G.723.1 frame can be one of three sizes: 24 bytes, 20 bytes, or 4 bytes. These 4-byte frames are called SID (silence insertion descriptor) and are used to specify comfort noise parameters. There is no restriction on how 4, 20, and 24 bytes are intermixed. The first two bits in the frame determine the frame boundary. It is possible to switch between the two rates at any 30 ms frame boundary. This packetization scheme is compliant to RFC 1890 for the packetization interval with the following specification:

1. The first packet of a talk-spurt (first packet after a silence period) is distinguished by setting the market bit in the RTP data header.
2. The sampling frequency (RTP clock frequency) is 8000 Hz.
3. The packetization interval should have a duration of 30 ms (one frame) as opposed to the default packetization of 20 ms
4. Codecs should be able to encode and decode several consecutive frames within a single packet.
5. A receiver should accept packets representing between 0 and 180 ms of audio data as opposed to the default of 0 and 200 ms.

Echo Cancellation Module 430

The DSP subsystem 382 supports a line echo cancellation (LEC) module 430 which complies the performance requirements of ITU G.165 except portion of tone disabler. The tone disabler defined by G.165 is primarily used to guard tones in telephone networks and can be implemented in the system when it is necessary. The echo cancellation uses signal correlation techniques to determine parameters of a filter that processes the incoming signal on the 4-wire side of a hybrid. The filter forms an estimate of the echo when an incoming signal is present. This estimate is subtracted from the signal on the return path.

Presently preferred embodiments have been set forth above. Persons of skill in the art will appreciate that modifications may be made from the disclosed embodiments without departure from the spirit and scope of the invention. For example, the assignment of processing to the RISC and/or DSP platforms is a matter of design choice and may vary from the embodiments set forth above. Further, the processing of the high level protocols can be distributed between the gateway and the modem platforms in a manner different from the described embodiments, without departure from the spirit of the invention. For example, the RTCP protocol processing may be distributed among the gateway platform and the modem platform, for example the information for the RTCP send and receive reports comes from the modem platform but the actual send and receive report may be generated and sent out by either the modem or DSP platform or the gateway platform. As a further example, while the best mode known to the inventors for practicing the invention has been disclosed in the context of present or proposed commercial products of the applicants' assignee, it will be appreciated that the teachings are readily adaptable to other types of network access servers marketed by others in the industry, such as Livingston, Ascend, Cascade Communications, etc. This true spirit and scope of the invention is defined by the following claims, to be interpreted in light of the above description.

We claim:

1. A method for routing data between a host connected to a computer network and a remote user connected to said host via a telephone line, the data associated with a higher level protocol for allowing the host to communicate with the remote user, said higher level protocol selected from the group of protocols consisting of the Point-to-Point Protocol and the Serial Line Interface Protocol, the method performed in a communications access system comprising a telephone line interface connected to said telephone line, a plurality of modems, each modem associated with a modem computing platform, and a network interface having a gateway computing platform, comprising the steps of:

receiving said data destined for said remote user and directing said data from said network interface to one of said modems in said communications access system;

distributing the processing of said higher level protocol for said data, such that said gateway computing platform performs a first portion of the processing of said higher level protocol and said modem computing platform in said modem performs a second portion of the processing of said higher level protocol; and subsequently directing the data from said modem computing platform through said telephone line interface onto said telephone line for transmission to said remote user.

2. A method for routing data between a host connected to a computer network and a remote user connected to said host via a telephone line, the data associated with a higher level protocol for allowing the host to communicate with the remote user, said higher level protocol comprising a real-time protocol associated with voice, video, and data communication, the method performed in a communications access system comprising a telephone line interface connected to said telephone line, a plurality of modems, each modem associated with a modem computing platform, and a network interface having a gateway computing platform, comprising the steps of:

receiving said data destined for said remote user and directing said data from said network interface to one of said modems in said communications access system;

distributing the processing of said higher level protocol for said data, such that said gateway computing platform performs a first portion of the processing of said higher level protocol and said modem computing platform in said modem performs a second portion of the processing of said higher level protocol; and subsequently directing the data from said modem computing platform through said telephone line interface onto said telephone line for transmission to said remote user.

3. The method of claim 2, wherein said protocol comprises the Real-time Transfer Protocol.

4. The method of claim 2, wherein said at least one modem computing platform performs the processing of jitter buffering for said data communication.

5. The method of claim 2, wherein said at least one modem computing platform performs processing of frame-based audio data associated with said protocol.

6. The method of claim 2, wherein said gateway computing platform performs the processing of creation and termination of audio streams associated with said protocol.

7. The method of claim 2, wherein said gateway computing platform performs the termination of RTCP traffic.

8. The method of claim 2, wherein said method is performed in an Internet telephony data session between said host and said remote user.

9. The method as claimed in any one of claims 1–8, wherein said method is performed in a high density network access server comprising a plurality of DSP cards connected by a high speed parallel bus to said network interface, each of said DSP cards providing modem functions for all DS0 channels of a T1 or E1 span line.

10. In a network access server for providing connectivity between a host source of digital data connected to a network and a remote terminal connected to the public switched telephone network, comprising, in combination a telephone line interface operatively connecting said network access server to a telephone line carrying digital telephone signals; a plurality of DSP computing platforms for demodulating inbound telephone signals and modulating outbound telephone signals for transmission on said telephone line to said remote terminal; a bus passing digital telephone signals from said telephone line interface to said DSP computing platforms; and a network interface receiving data from said modems via a bus and routing said data onto said network;

the improvement comprising:

said network interface comprising a computing platform processing a higher level protocol associated with communication between said remote terminal and said host on said network, said higher level protocol selected from the group of protocols consisting of the Point-to-Point Protocol and the Serial Line Interface Protocol, and wherein each of said plurality of DSP computing platforms performs the processing of a subset of functions associated with said higher level protocol associated with said communication.

11. In a network access server for providing connectivity between a host source of digital data connected to a network and a remote terminal connected to the public switched telephone network, comprising, in combination a telephone line interface operatively connecting said network access server to a telephone line carrying digital telephone signals; a plurality of DSP computing platforms for demodulating inbound telephone signals and modulating outbound telephone signals for transmission on said telephone line to said remote terminal; a bus passing digital telephone signals from said telephone line interface to said DSP computing platforms; and a network interface receiving data from said modems via a bus and routing said data onto said network;

the improvement comprising:

said network interface comprising a computing platform processing a higher level protocol associated with communication between said remote terminal and said host on said network, wherein said higher level protocol comprises a Real-time Transport Protocol (RTP), and wherein said plurality of DSP computing platforms performs the processing of a subset of functions associated with said higher level protocol.

12. The improvement of claim 11, wherein said plurality of DSP computing platform performs the processing of RTP header generation.

13. The improvement of claim 11, wherein said at least one modem computing platform performs the processing of a jitter buffer associated with said RTP.

14. The improvement of claim 10, wherein said DSP computing platforms are organized into a plurality of high density modem cards, each modem card associated with all the DS0 channels of a T1 or E1 span line.

15. A method of performing the processing of the Real-time Transport Protocol (RTP) protocol in a communication session from a source connected to a computer network and a destination connected to a telephone line, the method performed in a network access server, comprising the steps of:

passing RTP frames of data for said session from a gateway computing platform in said network access server having a network interface to a modem in said network access server;

performing jitter buffering for said RTP frames of data in a computing platform in said modem;

converting said RTP frames of data into a form suitable for transmission on said telephone line; and subsequently directing said data on said telephone line from said network access server to said destination.

16. The method of claim 15, wherein said modem platform further processes all frame-based audio data associated with said session.

17. The method of claim 15, wherein said method is performed in a network access server.

18. The method of claim 15, wherein said network access server comprises a high density network access server.

\* \* \* \* \*